(12) United States Patent
Markowitz

(10) Patent No.: US 7,000,569 B2
(45) Date of Patent: Feb. 21, 2006

(54) AUTOMATIC CAT GROOMING, FEEDING, AND LITTERBOX APPARATUS

(76) Inventor: Eli Markowitz, 868 E. 7th St., Apt. 5F, Brooklyn, NY (US) 11230

( * ) Notice: Subject to any disclaimer, the term of this patent is extended or adjusted under 35 U.S.C. 154(b) by 0 days.

(21) Appl. No.: 10/789,255

(22) Filed: Feb. 27, 2004

(65) Prior Publication Data
US 2004/0216691 A1    Nov. 4, 2004

Related U.S. Application Data

(63) Continuation of application No. 09/757,767, filed on Jan. 10, 2001, now Pat. No. 6,698,384.

(60) Provisional application No. 60/175,898, filed on Jan. 13, 2000.

(51) Int. Cl.
*A01K 13/00* (2006.01)
*A01K 1/03* (2006.01)
(52) U.S. Cl. .................... 119/622; 119/482; 119/165
(58) Field of Classification Search ............. 119/416, 119/436, 452, 456, 472, 473, 482, 496, 611, 119/612, 616, 720, 712, 706, 622, 621, 501, 119/652, 165
See application file for complete search history.

(56) References Cited

U.S. PATENT DOCUMENTS

| | | | | |
|---|---|---|---|---|
| 2,976,841 A | * | 3/1961 | Scheffer | 119/622 |
| 4,171,683 A | * | 10/1979 | Godin | 119/482 |
| 4,803,952 A | * | 2/1989 | Houser | 119/499 |
| 5,092,277 A | * | 3/1992 | Baillie et al. | 119/165 |
| 5,247,901 A | * | 9/1993 | Landon et al. | 119/419 |
| 5,351,653 A | * | 10/1994 | Marischen et al. | 119/719 |
| 5,361,725 A | * | 11/1994 | Baillie et al. | 119/165 |
| D356,442 S | * | 3/1995 | Hayes et al. | D4/114 |
| 5,458,088 A | * | 10/1995 | Owens | 119/622 |
| 5,678,509 A | * | 10/1997 | Dillon | 119/496 |
| 5,782,206 A | * | 7/1998 | Markowitz | 119/622 |
| 5,791,288 A | * | 8/1998 | Ehrler | 119/163 |
| 5,806,461 A | * | 9/1998 | Kiera | 119/165 |
| 5,890,455 A | * | 4/1999 | Donchey | 119/484 |
| 5,964,189 A | * | 10/1999 | Northrop et al. | 119/482 |
| 5,970,556 A | * | 10/1999 | Nemoto | 15/1.51 |
| 6,050,223 A | * | 4/2000 | Harris | 119/165 |
| 6,209,490 B1 | * | 4/2001 | Schwede | 119/472 |
| 6,257,172 B1 | * | 7/2001 | Leppanen | 119/605 |

FOREIGN PATENT DOCUMENTS

JP          401291733 A   * 11/1989

* cited by examiner

*Primary Examiner*—Peter M. Poon
*Assistant Examiner*—Timothy D Collins
(74) *Attorney, Agent, or Firm*—Bernard Malina; Malina & Associates, P.C.

(57) ABSTRACT

An apparatus for grooming cats which includes a source of food located in an enclosure and a grooming brush assembly forming an adjustable aperture which is mounted between a portal formed in the enclosure and the source of food.

28 Claims, 29 Drawing Sheets

FIG.27

NOTE: A SENSOR IS ON WHEN
THERE IS A CAT NEAR THE SENSOR

| SENSOR | SENSOR STATUS | RESULT |
|---|---|---|
| S2 AND S3 AND S4 | ON | BRUSH BLOWER ON<br>BRUSH BLOWER TIMER STARTED<br>FEEDING STATION LID OPEN<br>FEEDING STATION TIMER STARTED |
| S2 OR S3 OR S4 | OFF | BRUSH BLOWER OFF<br>FEEDING STATION LID CLOSED |
| S5, S6 AND S7 | ON | BRUSH BLOWER ON<br>BRUSH BLOWER TIMER STARTED<br>FEEDING STATION LID OPEN<br>FEEDING STATION TIMER STARTED |
| S1 | ON | FEEDING STATION OPEN<br>IONIZER ON |
| S8 | ON | FEEDING STATION LID OPEN<br>FEEDING STATION TIMER ON |
| S9 | ON | LITTER BOX LID OPEN<br>LITTER BOX TIMER ON |

# AUTOMATIC CAT GROOMING, FEEDING, AND LITTERBOX APPARATUS

RELATED APPLICATIONS

This application is a continuation and claims priority from U.S. patent application Ser. No. 09/757,367 filed Jan. 10, 2001 now U.S. Pat. No. 6,698,384 which claims priority from Provisional Application Ser. No. 60/175,898 filed Jan. 13, 2000.

FIELD OF THE INVENTION

The present invention relates generally to the field of apparatus for pet cats and more particularly, to an automatic cat grooming and feeding and litterbox apparatus.

BACKGROUND OF THE INVENTION

The prior art includes various devices for providing an enclosed litterbox for cats. Despite the various individual devices in the prior art for feeding, grooming and providing a litterbox for pet cats there remains a need for an enclosed apparatus which incorporates the functions of automatically feeding, grooming and providing a litterbox for cats.

OBJECTS OF THE INVENTION

It is an object of the present invention to provide an automatic grooming, feeding and litter box apparatus which features a multi-level structure.

Another object of the present invention is to provide an automatic grooming, feeding, and litter box apparatus which is adjustable in size.

Yet another object of the present invention is to provide an automatic grooming, feeding, and litter box apparatus which features an adjustable grooming maze.

Still another object of the present invention is to provide an automatic grooming, feeding, and litter box apparatus which is adjustable in order to accommodate different size animals with different degrees of familiarity with the apparatus.

Yet another object of the present invention is to provide an automatic grooming, feeding, and litter box apparatus which features an abrasive nail grooming section.

It is another object of the present invention to provide an automatic grooming, feeding, and litter box apparatus which features a clay nail and paw cleaning and grooming section.

A further object of the present invention is to provide an automatic grooming, feeding, and litter box apparatus which features a magnetic door closure.

Another object of the present invention is to provide an automatic grooming, feeding, and litter box apparatus which traps and contains animal odors and unwanted animal by-products in cleaning dander.

Still another object of the present invention is to provide an automatic grooming, feeding, and litter box apparatus which includes electrostatic charged plates.

Still a further object of the present invention is to provide an automatic grooming, feeding, and litter box apparatus which features a grooming brush which discharges a powder substance, mist substance or spray substance.

Another object of the present invention is to provide an automatic grooming, feeding, and litter box apparatus which features an electrically operated pressure discharge brush.

Still another object of the present invention is to provide an automatic grooming, feeding, and litter box apparatus which features a brush with hollow bristles.

Yet another object of the present invention is to provide an automatic grooming, feeding, and litter box apparatus which features a brush with grooming barbs.

A further object of the present invention is to provide an automatic grooming, feeding, and litter box apparatus which features a brush with a skin massage section.

Another object of the present invention is to provide an automatic grooming, feeding, and litter box apparatus which features an automatically operated feeding station.

Still a further object of the present invention is to provide an automatic grooming, feeding, and litter box apparatus which features an automatically operated litter box station.

A further object of the present invention is to provide an automatic grooming, feeding, and litter box apparatus which features an air conditioning and moisturizing station to keep an animal's body in a healthy condition.

Another object of the present invention is to provide an automatic grooming, feeding, and litterbox apparatus which can be adjusted in any direction.

Another object of the present invention is to provide a method for animal training which features systematic introduction of the apparatus.

Another object of the present invention is to provide a method for animal training which features systematic and progressive removal of elements of the apparatus once the animal has been trained.

Another object of the present invention is to provide an automatic grooming, feeding, and litterbox apparatus can be utilized in a tunnel configuration to provide a cleansing action.

Another object of the present invention is to provide an automatic grooming, feeding, and litterbox apparatus which enables an owner to maintain visual contact with a pet animal during operation.

Another object of the present invention is to provide an automatic grooming, feeding, and litterbox apparatus in which grooming brushes are mounted on flexible supports.

Yet another object of the present invention is to provide an automatic grooming, feeding, and litter box apparatus which incorporates a relatively small number of component parts which can be manufactured economically resulting in a relatively low overall cost.

Other objects and advantages of the present invention will become apparent hereinafter.

BRIEF DESCRIPTION OF THE DRAWINGS

Important objects and advantages of the invention will be apparent from the following description taken in connection with the accompanying drawings.

FIG. 27 is a tubular drawing for use with FIG. 26 showing the results of the activation of the various sensors of FIG. 26;

DETAILED DESCRIPTION OF THE INVENTION

Figure 1:
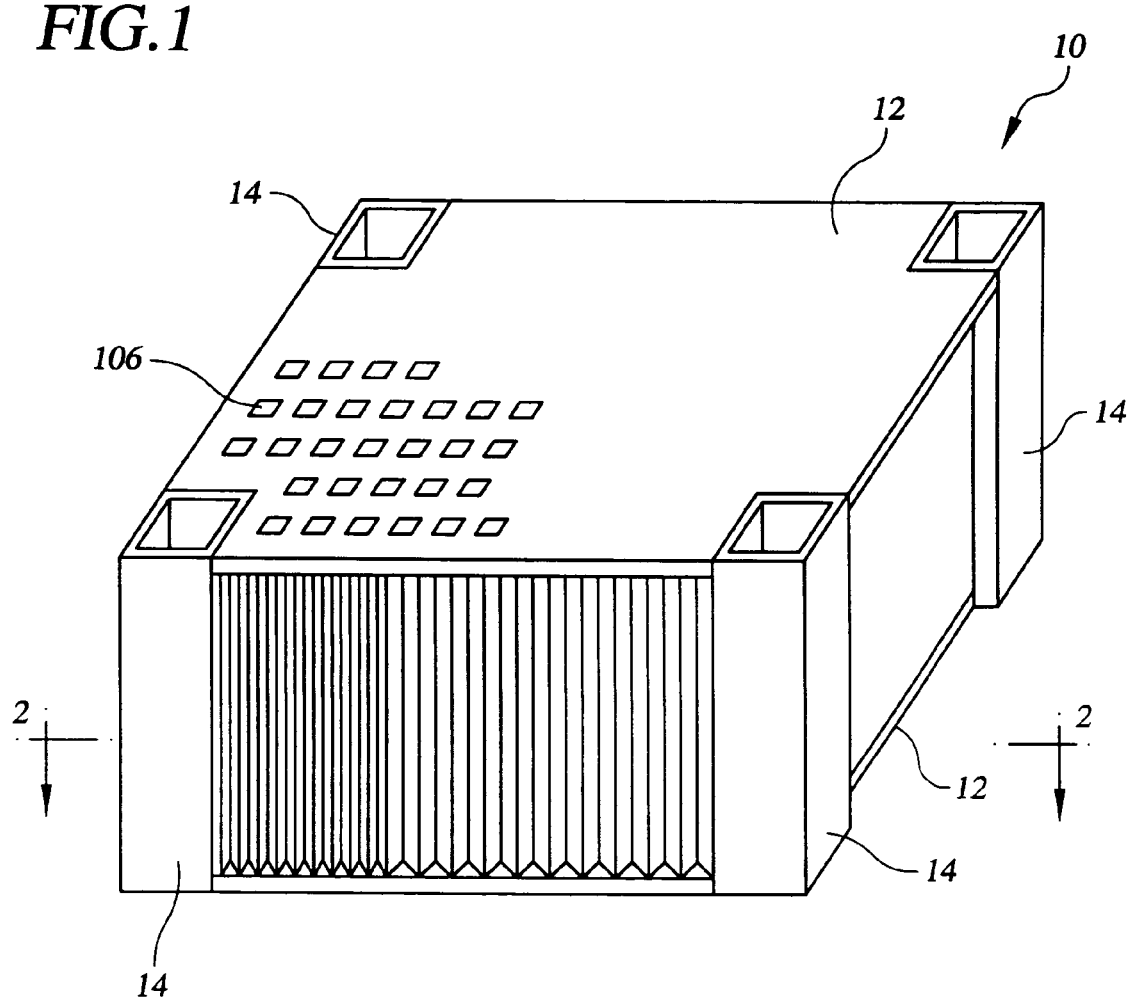
FIG. 1 is an overall perspective view of a cat grooming and feeding apparatus, made according to the present invention.
Figure 2:
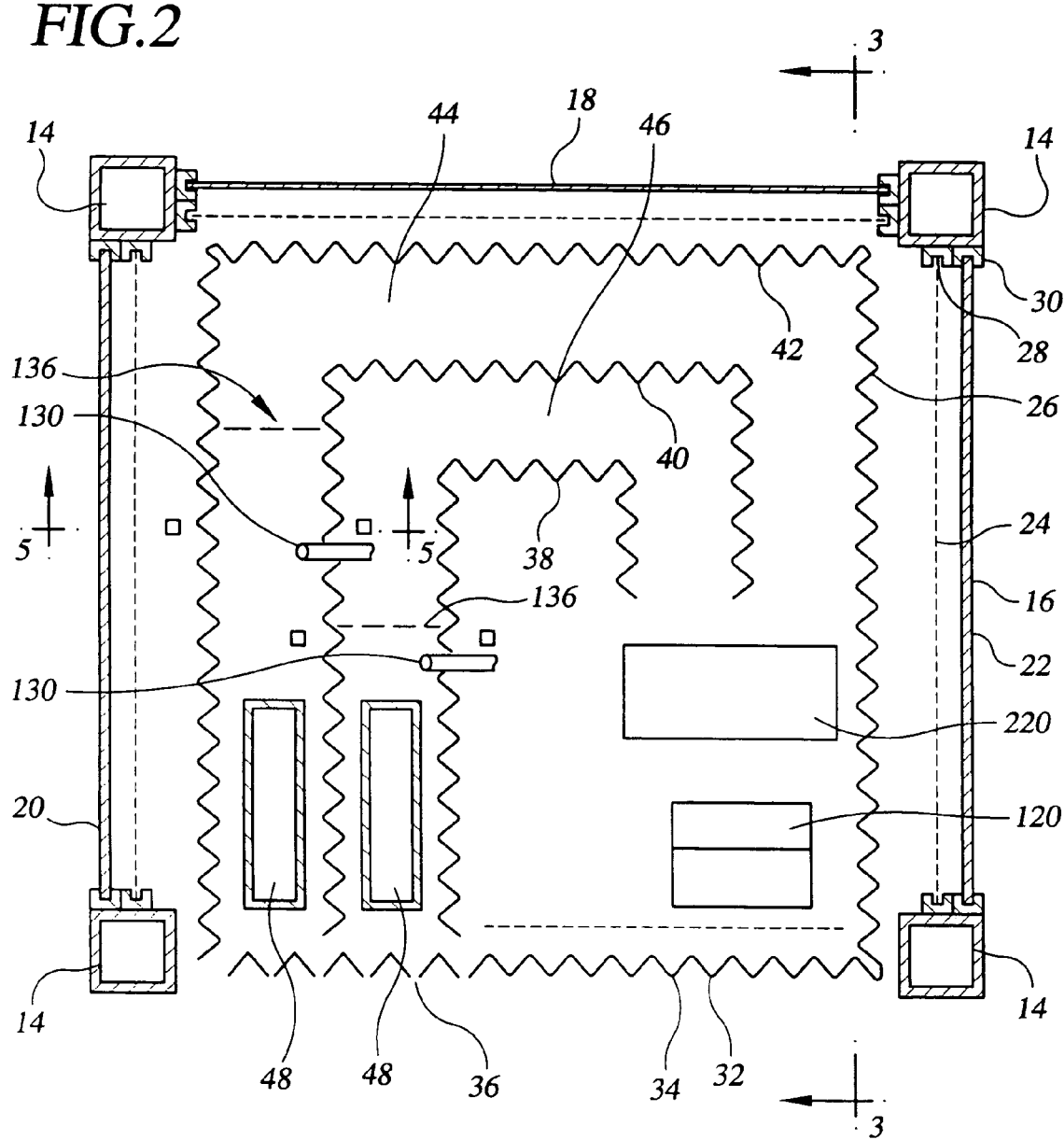
FIG. 2 is a cross-sectional view of the apparatus of FIG. 1 taken along the line 2—2 of FIG. 1.
Figure 3:
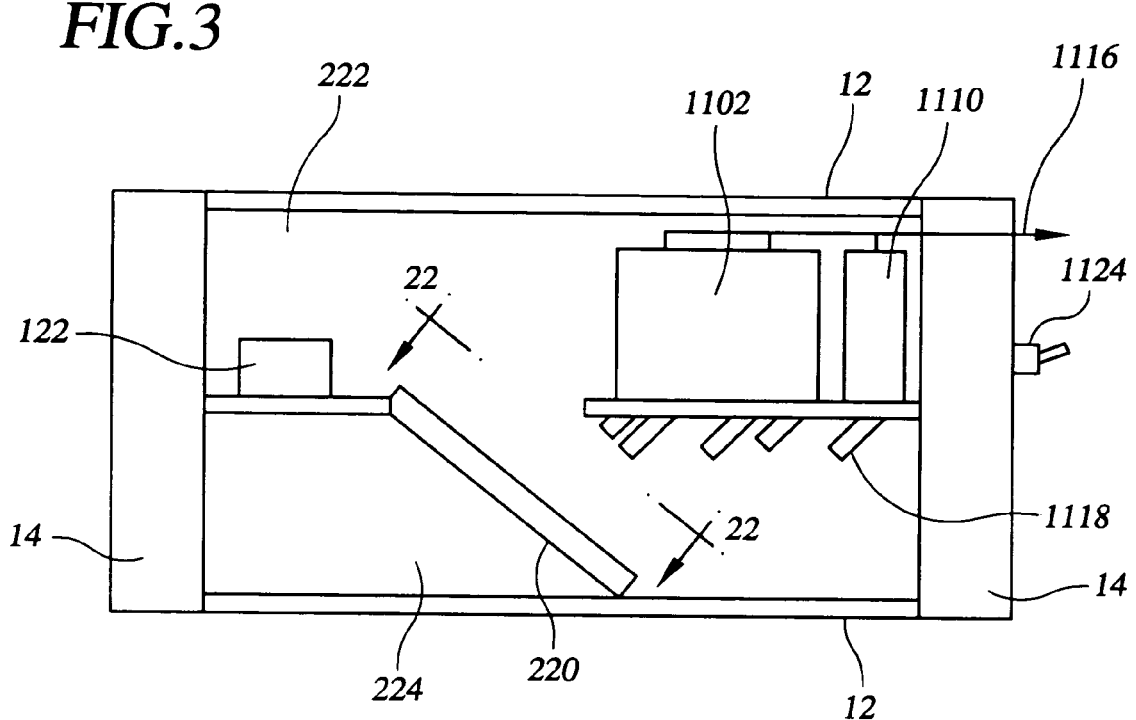
FIG. 3 is a cross-sectional view taken along the line 3—3 of FIG. 2.
Figure 4:
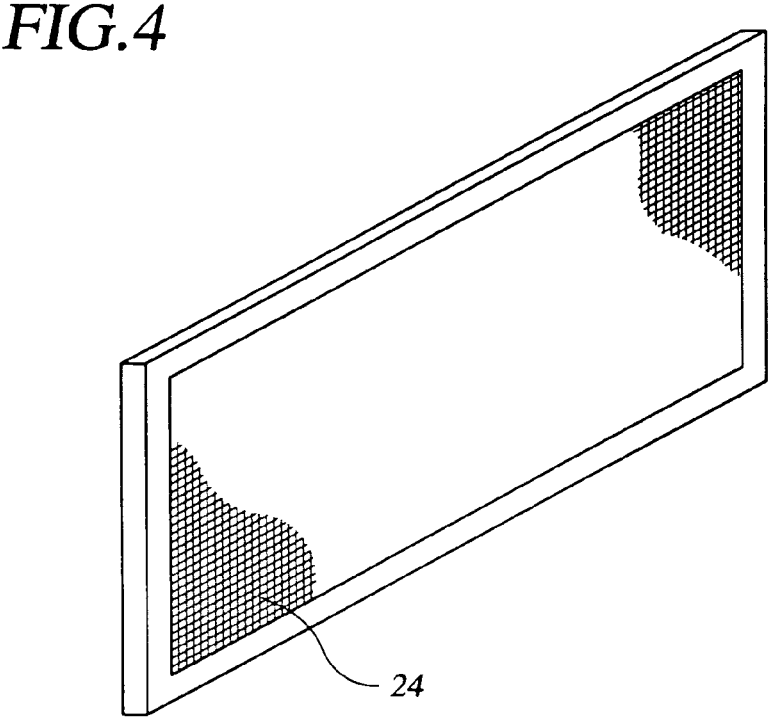
FIG. 4 is a perspective view of a mesh panel with the mesh panel shown removed from the apparatus of FIG. 1.

As is shown in FIGS. 1–3, the structure of the automatic cat grooming and feeding apparatus 10 includes a pair of grid plates 12 which support four corner poles 14. As is shown in FIG. 2, three of the side walls 16, 18, 20 include a solid plastic sheet 22, a mesh screen 24 and an accordion shaped elastic sheet 26. The plastic sheet 22 and the mesh screen 24 are mounted in tracks or guides 28, 30 which are attached to the poles 14. The elastic sheet 32 on the fourth or front wall 34 includes a plurality of slits 36 which enable a cat to enter the apparatus 10.

The elastic sheets 26, 32 are attached to the upper and lower grid plates 12 by means of barbs 104, as is best shown in FIGS. 7–10. The barbs 104 are used to engage the holes 106 in the grid plates 12.

Figure 11:
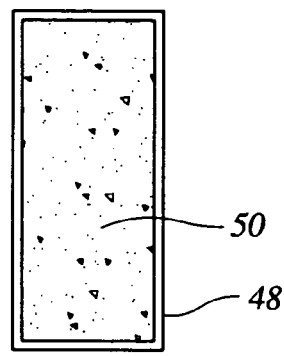
FIG. 11 is a top plan view of a clay nail cleaning unit of the apparatus of FIG. 1.
Figure 12:
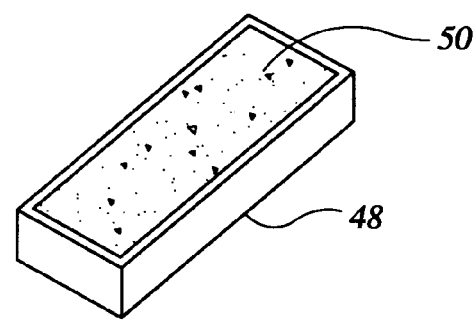
FIG. 12 is a perspective view of the clay carpet unit of FIG. 1.
Figure 14:
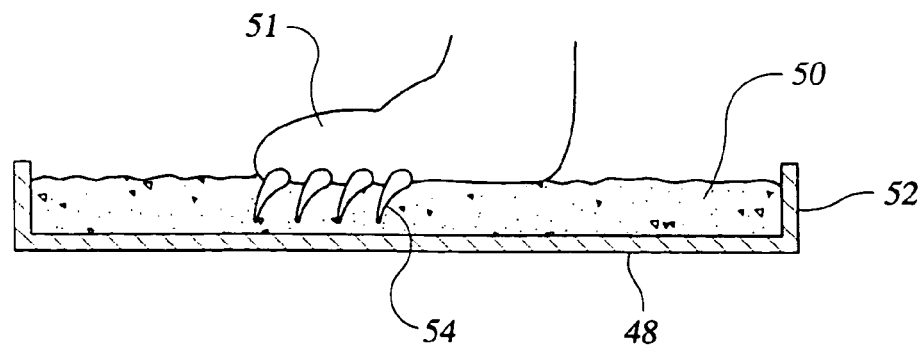
FIG. 14 is a cross-sectional view of the clay carpet unit of FIG. 11, with the clay carpet unit shown in use by a cat.
Figure 15:
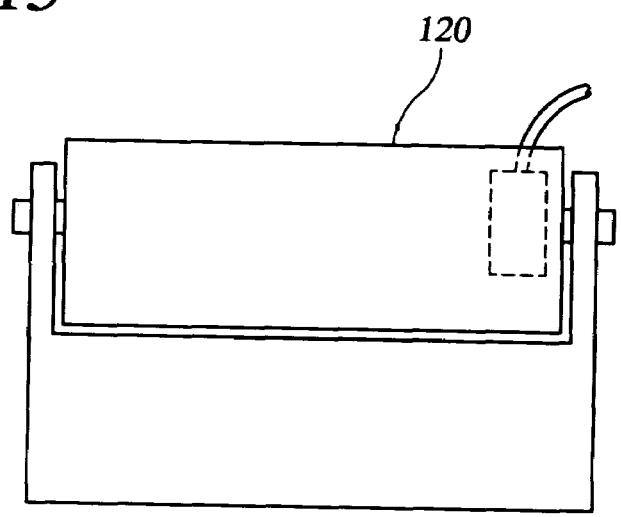
FIG. 15 is a top plan view of the feeding station of the apparatus of FIG. 1, with the feeding station shown removed from the apparatus.

As is best shown in FIG. 2, additional elastic sheets 38, 40, 42 form a pair of mazes 44, 46 within the apparatus 10. At the entrance to each of the mazes 44, 46, there is a portion of clay carpet flooring 48 which is shown in FIGS. 11 and 12. The clay carpet 48 is formed by a clay material 50 held in a tray-like container 52. The clay material 50 serves to clean the cat's nails 54 as is shown in FIG. 14.

Figure 5:
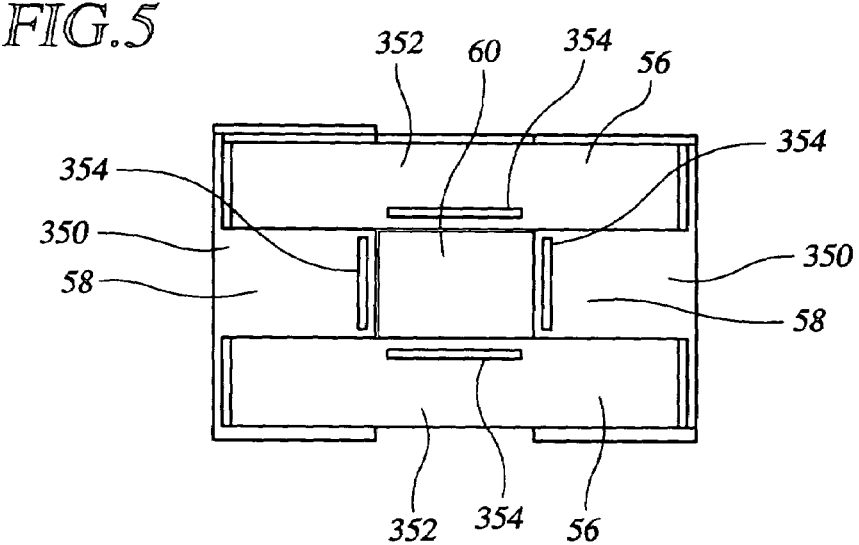
FIG. 5 is a cross-sectional view taken along the line 5—5 of FIG. 2 showing the supports for the horizontal and the vertical brushes.
Figure 6:
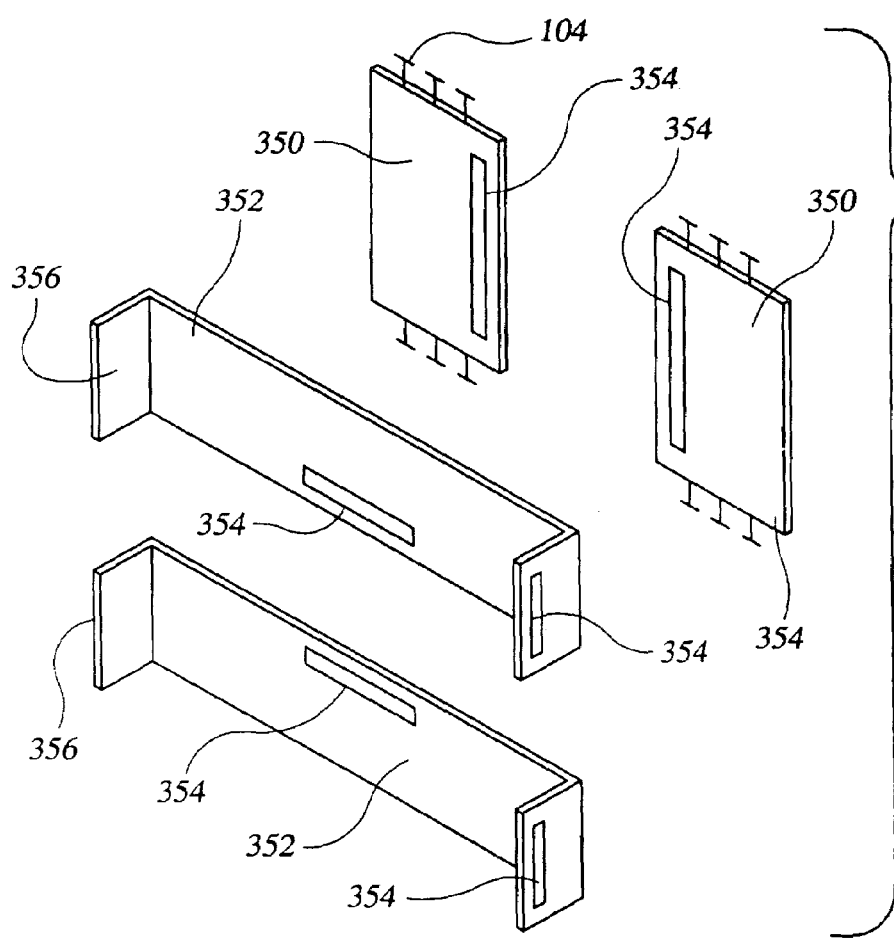
FIG. 6 is an exploded view of the supports shown in FIG. 5.
Figure 7:
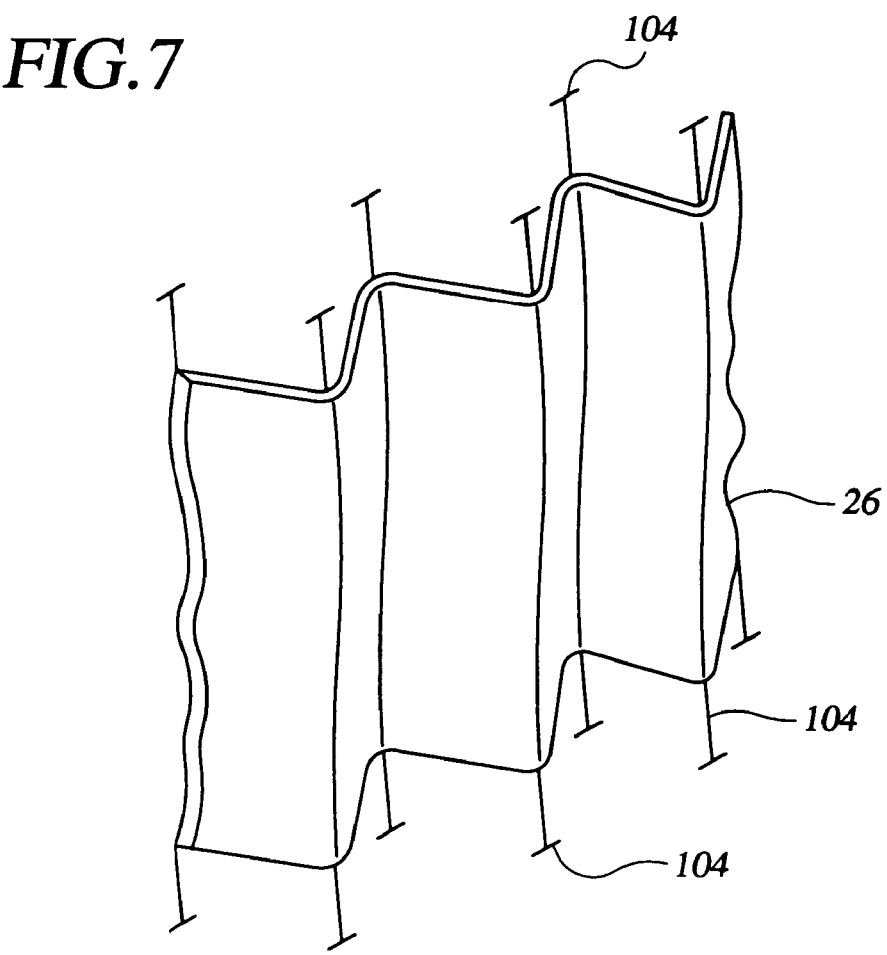
FIG. 7 is a fragmentary exploded view of the accordion wall of the apparatus of FIG. 1 showing the barbs for attachment of the accordion wall to the upper and lower grid plates.
Figure 8:
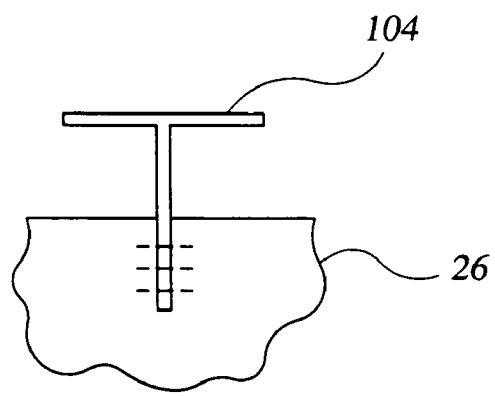
FIG. 8 is a fragmentary elevation view of an attachment barb of FIG. 7.
Figure 9:
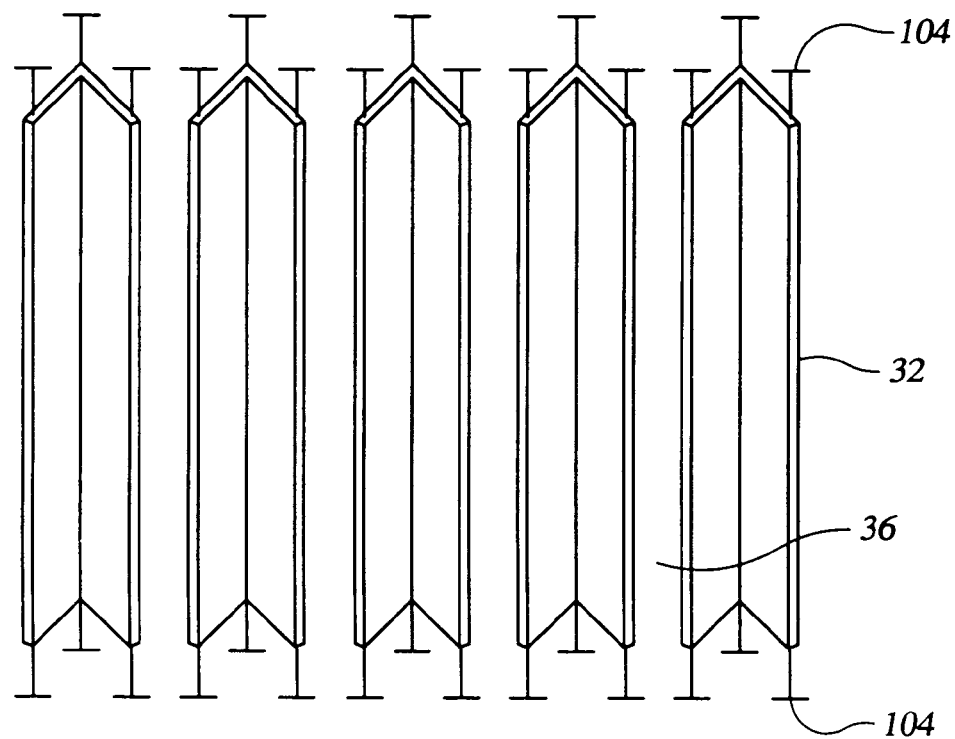
FIG. 9 is a fragmentary view of the entrance portion of the accordion wall.
Figure 10:
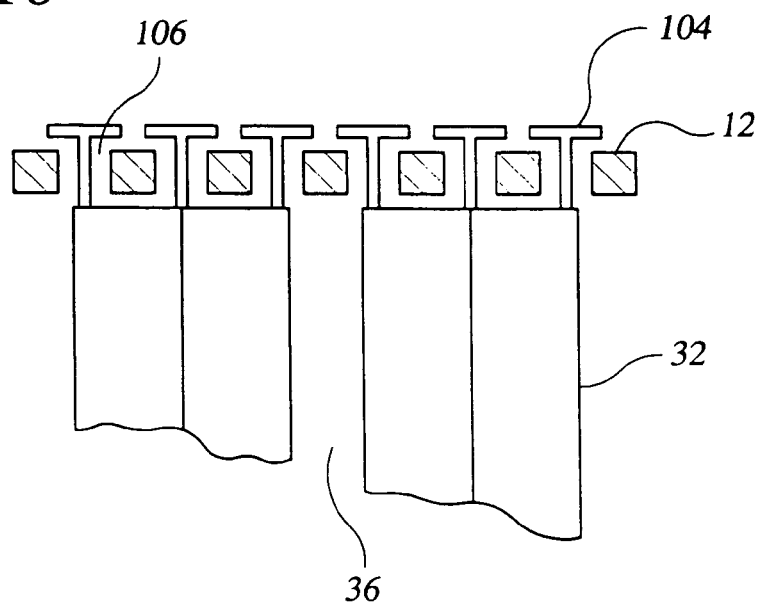
FIG. 10 is a fragmentary cross-sectional view showing the attachment of the accordion wall of FIG. 9 to the upper grid plate of FIG. 1.
Figure 17:
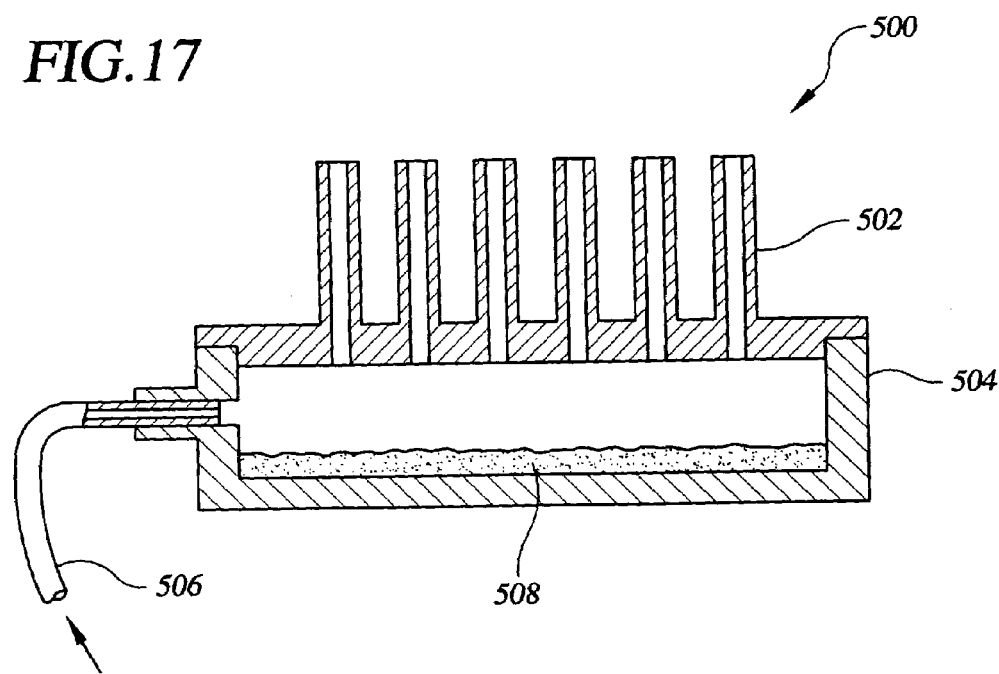
FIG. 17 is a cross-sectional view of a typical brush of the apparatus of FIG. 1 showing the hollow bristles and the porch base for storing powder substances.

The horizontal and vertical brush structures 56, 58 are shown in FIGS. 5 and 6. The details of construction of the brushes are shown in FIG. 17. The construction of the brush structures 56, 58 will be further described presently.

Figure 24:
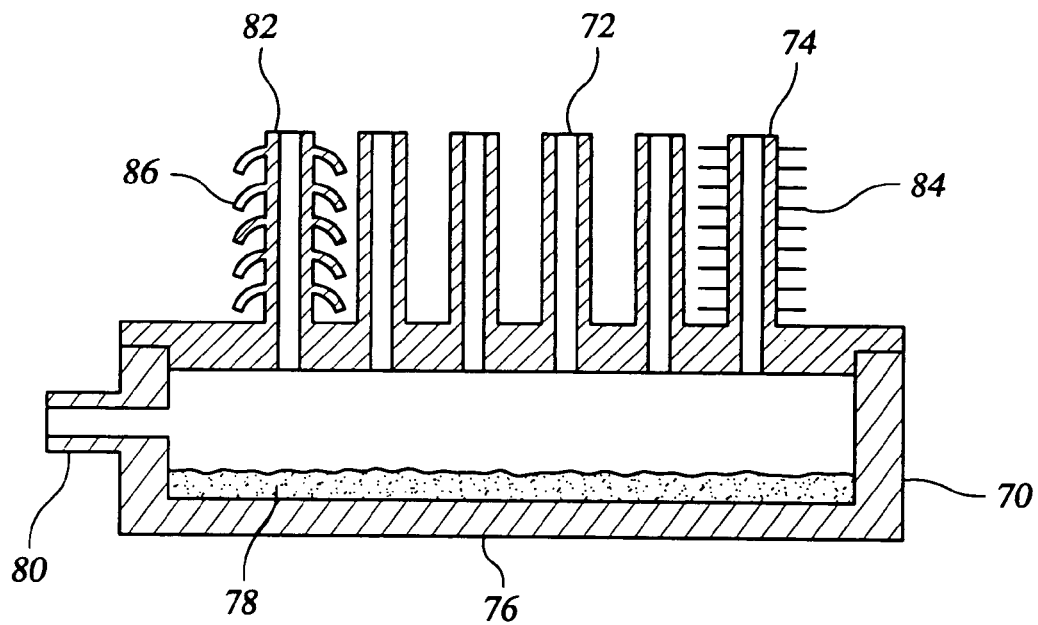
FIG. 24 is a cross-sectional view of an alternative embodiment of the brush of FIG. 17 showing hollow bristles having various projections and barbs.

The brush 70 as shown in FIG. 24, has hollow bristles 72 which communicate with a powder structure 76 containing a powder substance 78 which may be medicinal or cleansing in nature. The powder structure 76 is connected to a brush blower via a tube 80.

FIG. 24 also shows bristles 74, 82 which incorporate straight barbs 84 and curved barbs 86.

Figure 25:
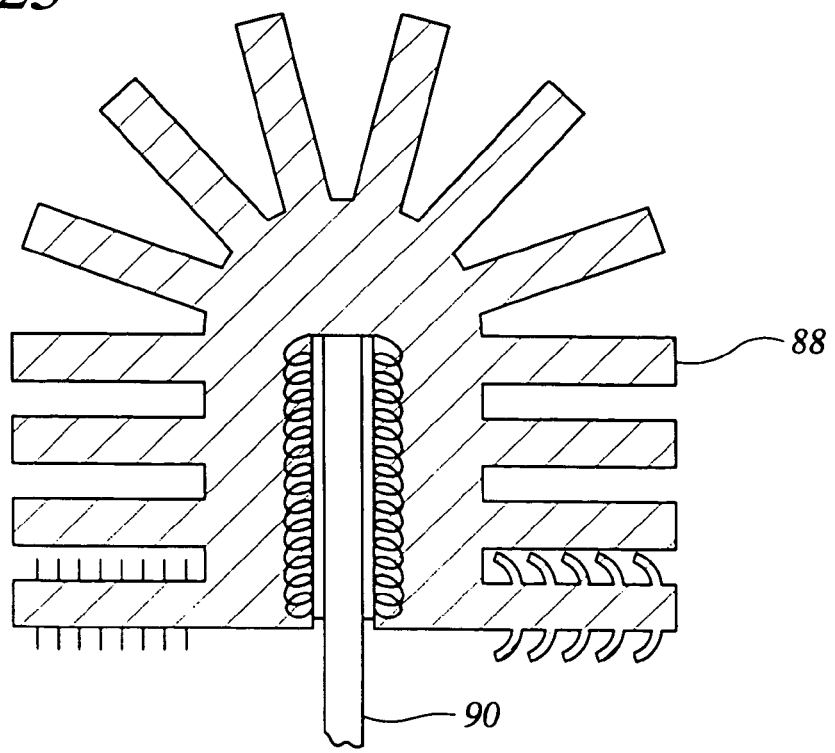
FIG. 25 is a cross-sectional view of the brush of FIG. 24 shown attached to a brush support member.

FIG. 25 shows a brush 88 mounted on a support structure 90.

Figure 28:
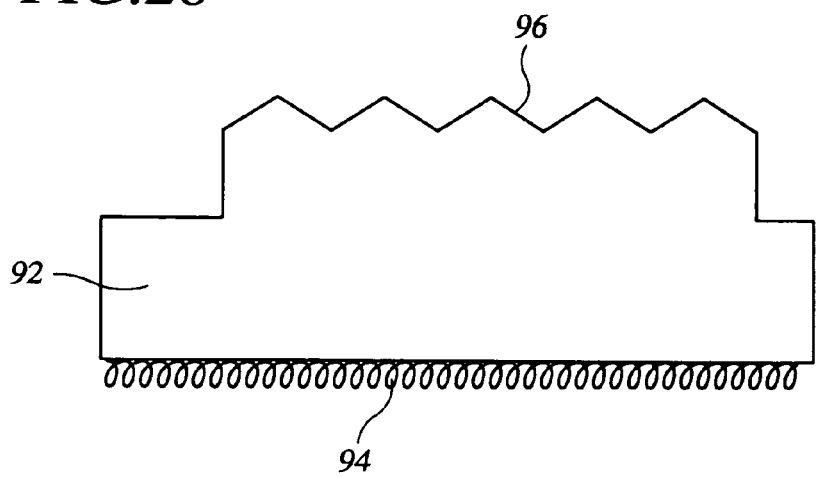
FIG. 28 is a front elevational view of a shedder for use with brushes of the apparatus of FIG. 1.
Figure 29:
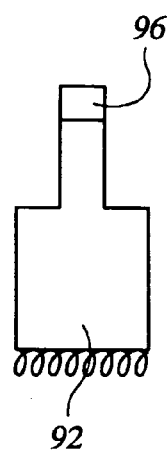
FIG. 29 is a side elevational view of the shedder of FIG. 28.
Figure 30:
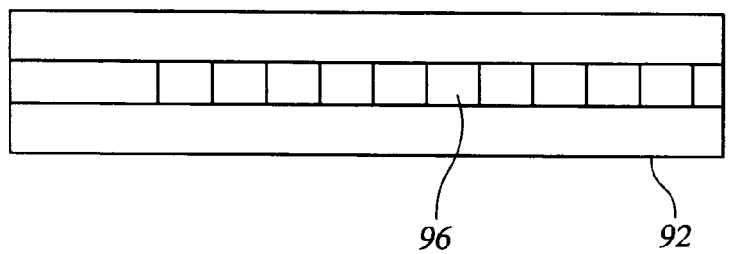
FIG. 30 is a top elevational view of the shedder of FIG. 28.
Figure 33:
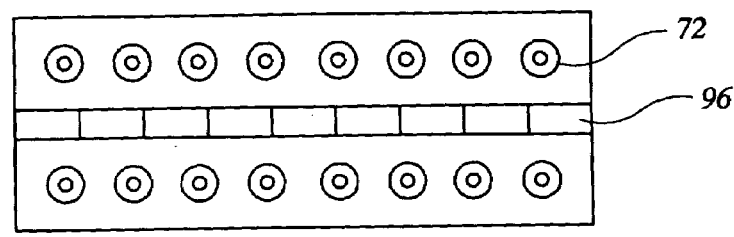
FIG. 33 is a top plan view of an alternative embodiment of the brush of the apparatus of FIG. 1 which incorporates the shedder of FIG. 28 between the rows of bristles.

FIGS. 28–30 show a grooming member 92 which is used in combination with a brush and which includes a plurality of teeth 96 and a hook and loop fastener 94. FIG. 33 shows the grooming member 90 integrated with the bristles of a brush.

Figure 31:
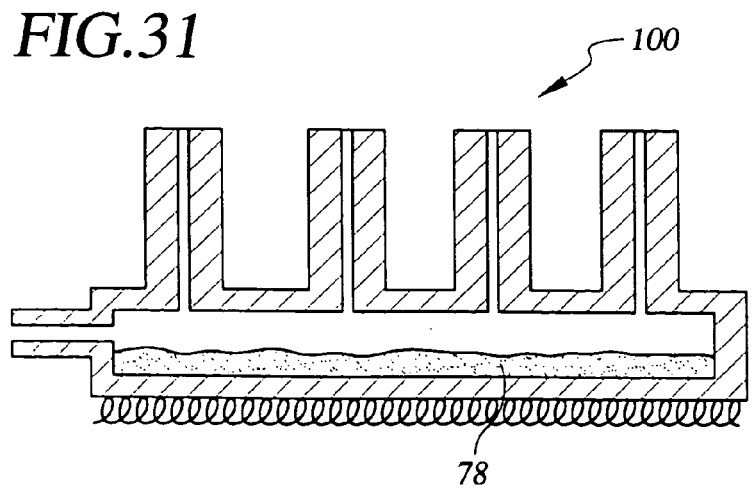
FIG. 31 is a cross-sectional view of an alternative embodiment of the brush of the apparatus of FIG. 1.
Figure 32:
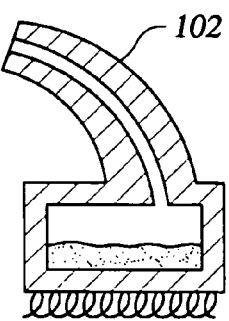
FIG. 32 is a cross-sectional view of the brush of FIG. 31 showing the curvature of the bristles.

FIGS. 31 and 32 show another alternative embodiment of the brush 100 which incorporates curved bristles 102. The brush 100 incorporates a hook and loop fastener 106.

Figure 16:
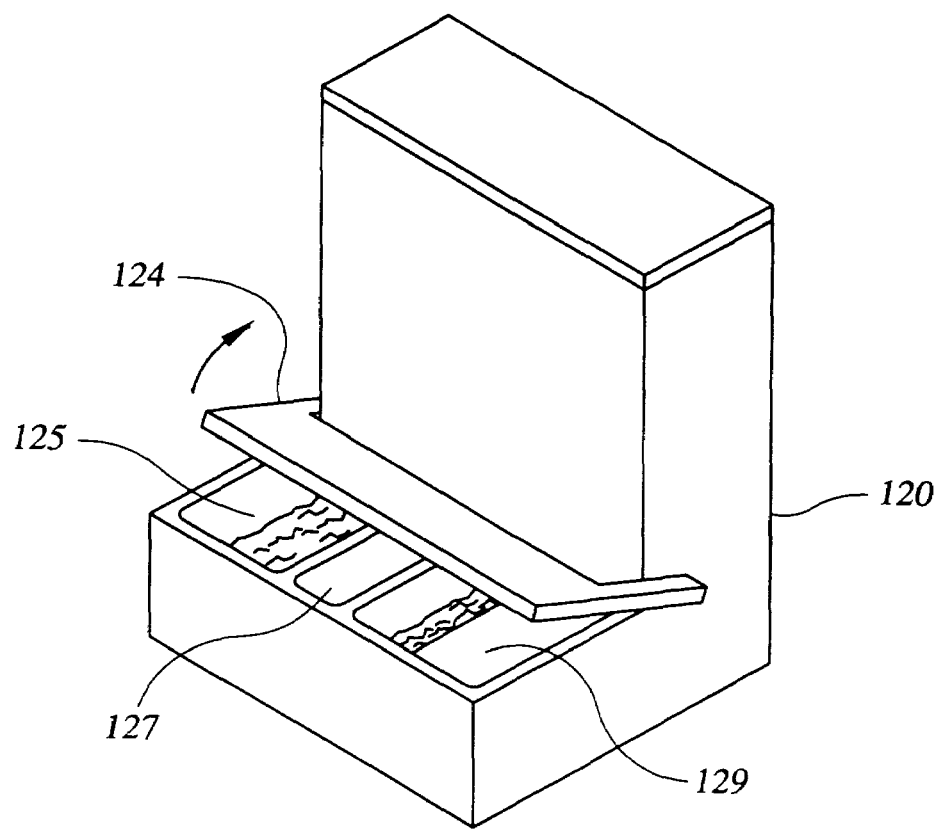
FIG. 16 is an overall perspective view of the feeding station of FIG. 15, with the motorized lid of the feeding station shown partially open.
Figure 23:
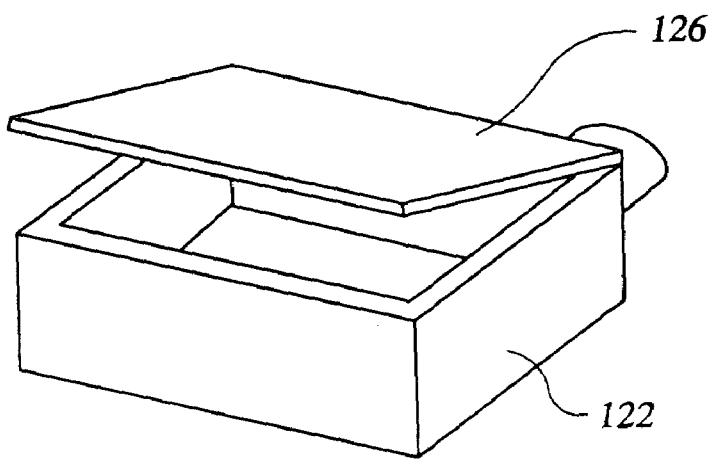
FIG. 23 is an overall perspective view of the litter box station of the apparatus of FIG. 1 with the motorized lid of the litter box station shown partially open.
Figure 26:
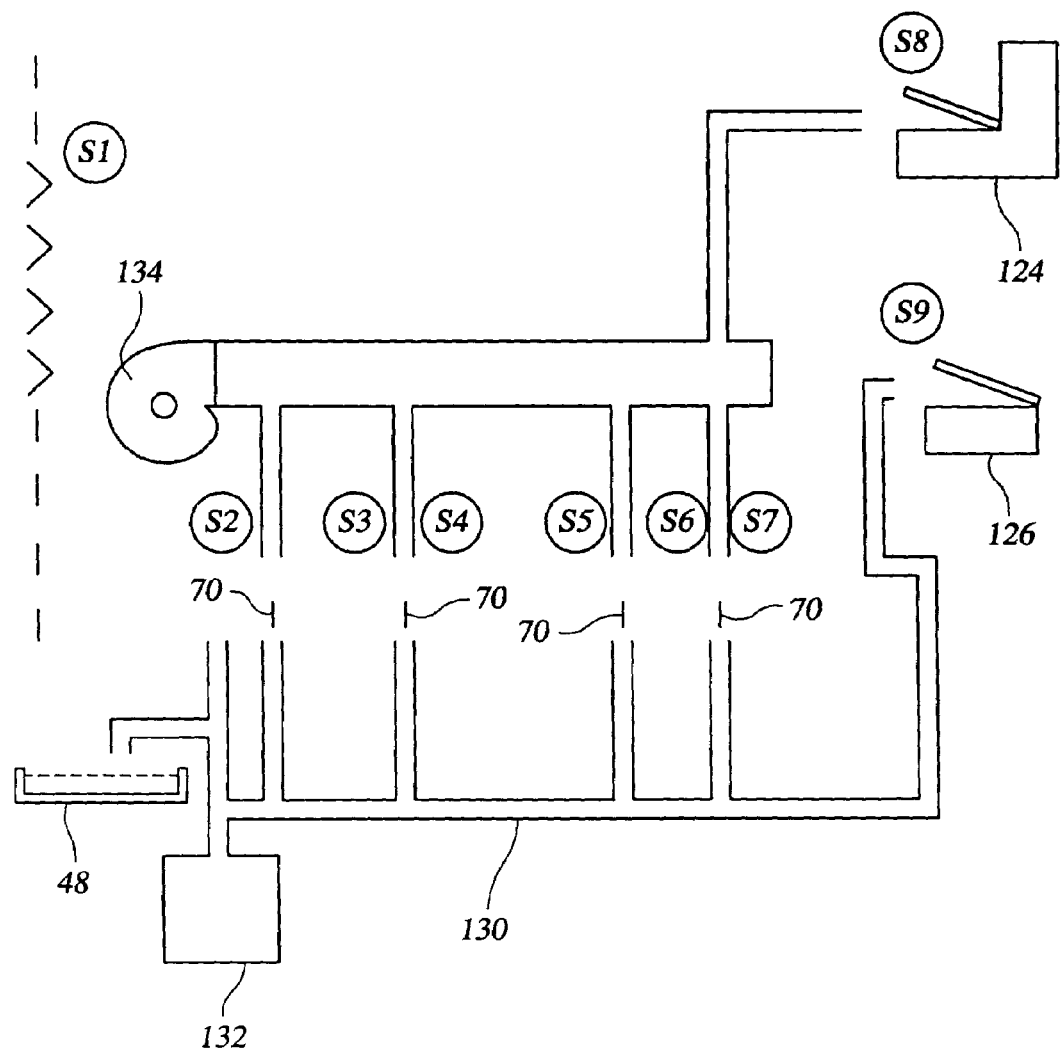
FIG. 26 is an overall schematic diagram showing the sensor system of the apparatus of FIG. 1.

Apparatus 10 includes a feeding station 120 and litter box 122 which have motorized lids 124, 126 as shown in FIGS. 16 and 23. The motorized lids 124, 126 are controlled by the sensor system 130 which is shown in FIGS. 2, 26 and 27. The feeding stations 120 includes three compartments 125, 127, 129 for different types of food or liquid.

The sensor system 130 turns the vaporizer/moisturizer system 132 on, the brush blower 134 on, and opens the feeding station lid 124 when the cat's head has passed through the brushes, thereby allowing discharge of powder from the brushes onto the cat's body but not onto the cat's head.

The vaporizer/moisturizer system 132 includes a network of tubes 180 to distribute moisture and the sensor system 130 includes sensors S1, S2, S3, S4, S5, S6, S7, S8 and S9 which control the operation of the blower 134, feeding station 124, litterbox 122, and the vaporizer moisturizer system 132.

Figure 19:
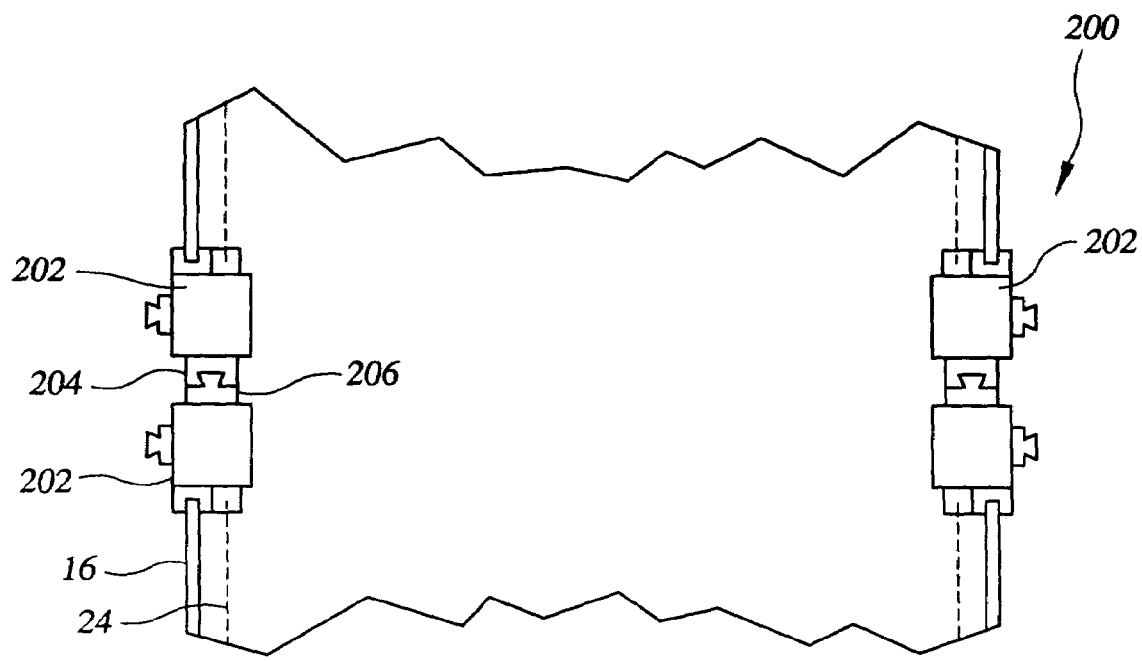
FIG. 19 is a fragmentary horizontal cross-sectional view showing another alternative embodiment of the invention which features dove-tailed engagement portions on the vertical columns which support the horizontal grid plates thereby facilitating attachment of multiple apparatus assemblies.

FIG. 19 shows an alternative construction 200 of the poles 202 which incorporates tongue and groove connectors 204, 206 which enable a user to connect additional enclosures each similar to the apparatus 10 described in FIGS. 1 and 3 to form a larger structure.

Figure 13:
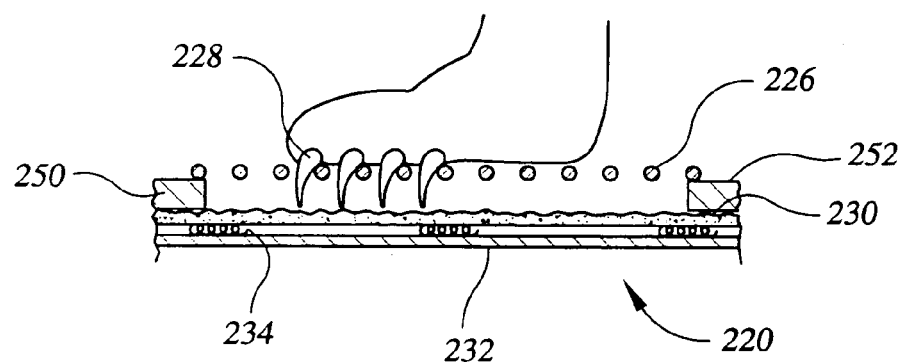
FIG. 13 is a fragmentary cross-sectional view of the ramp member of FIG. 1, with the ramp member shown in use grooming a cat's nails.

FIG. 13 shows the structure of the ramp 220 which connects the upper and lower levels 222, 224 of the apparatus 10 which are shown in FIG. 3. The ramp 220 includes a mesh screen 226 which can be penetrated by the cat's claws 228 thereby enabling the claws 228 to be groomed by an abrasive layer 230 which is mounted on the base 232 of the ramp 220. The abrasive layer 232 is connected to the base 232 of the ramp 220 by a hook and loop fastener 234.

Figure 20:
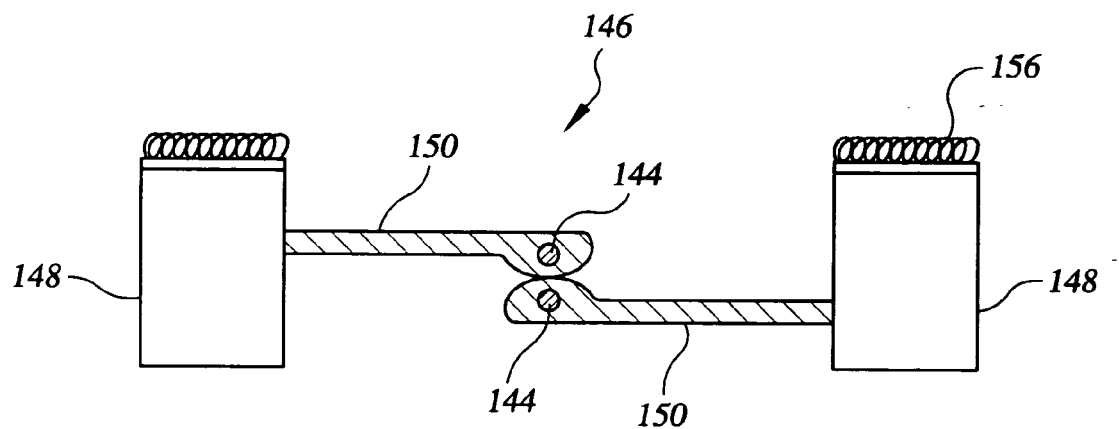
FIG. 20 is a cross-sectional view of an alternate entrance portion of the apparatus of FIG. 1 which features a magnetic closure.
Figure 21:
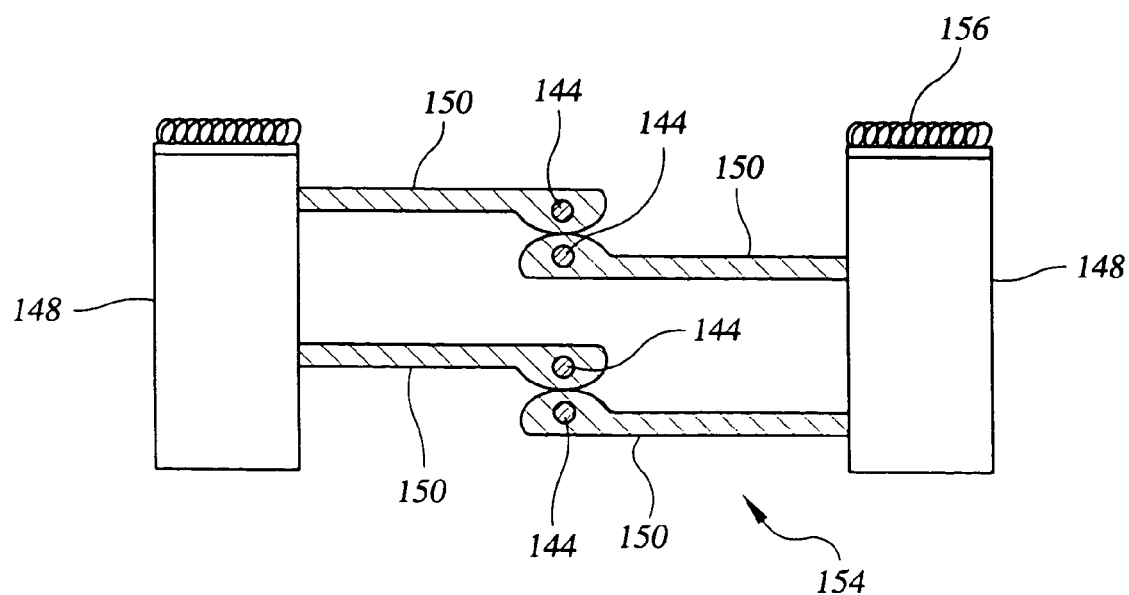
FIG. 21 is a cross-sectional view of another alternative entrance of the apparatus of FIG. 1 which features a pair of magnetic door closures.

FIGS. 20 and 21 show alternative entrance structures which incorporate magnetic strips 144.

The door assemblies 146, 154 shown in FIGS. 20, 21 include a pair of support posts 148 which are connected to a pair of flexible door panels 150. The inner edges 152 of the door panels 150 are connected by the flexible magnetic strips 144. When in the closed position, shown in FIGS. 20, 21, the door assemblies 146, 154 provide a seal and prevent odors from exiting the apparatus 10. The flexible door panels 150 can bend inwardly in response to pressure applied by a cat thereby enabling a cat to easily enter and leave the apparatus 10.

After the cat has entered the apparatus 10, the door panels 150 return to their original position and the magnetic strips 144 hold the door panels 150 closed.

The support posts 148 are attached to the apparatus 10 by a pair of hook and loop type of fasteners 156.

In an alternative embodiment of the invention 300, the door assemblies 146, 154 may be mounted on the door or wall of a dwelling to provide access for a pet.

The aperture 60 formed by the horizontal and vertical brush structures 56, 58 has been shown in FIGS. 5 and 6.

The aperture 60 is formed by a pair of vertical flexible elastic members 350 and a pair of horizontal flexible elastic members 352 which define the aperture 60. The portions 354 of the members 350, 352 adjacent to the aperture 60 include hook and loop fasteners which are illustrated symbolically by the rectangles 354. The vertical and horizontal members 350, 352 are attached to the apparatus 10 by flaps 356 which include hook and loop fasteners. The vertical members are connected to the grid members 12 by barbs 104.

The hook and loop fasteners 354 and the barbs 104 allow the space between the panels 354 and 352 to be adjusted in accordance with the desire of the owner. For example, the space between the panels may be made relatively large in relationship to the body of the pet for pets who have just been introduced to the apparatus 10.

The space may be decreased once the pet has become familiar with the apparatus 10. The panels stretch around the body of the pet when the size of the aperture is decreased.

The variation in width of the panels is accomplished by folding the horizontal members.

Figure 22:
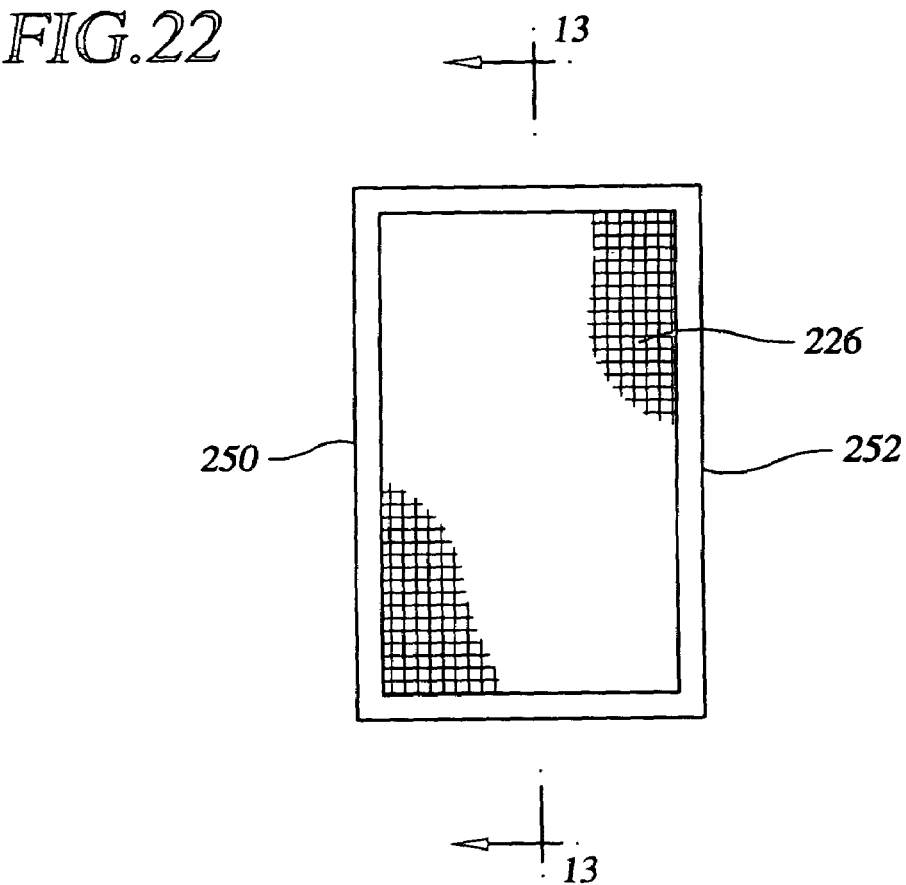
FIG. 22 is a top plan view of the ramp portion of the apparatus of FIG. 1.

The nail grooming assembly shown in FIGS. 13 and 22 includes a grid or an array of wires 226 which are mounted on supports 250, 252. The supports space the grid 226 on the array of wires slightly away from an abrasive layer 230 such as sand paper or a similar material. When a cat places a paw on the wires 226, the cat's nails 228 enter the spaces between the wires 226 and the points of the nails bear against and are groomed or blunted by the sand paper 230.

The placement of the assembly on the ramp 226 aids in the relative motion and consequent blunting of the cat's nails 228 as the cat moves up and down the ramp 220.

As is shown in FIG. 14, the clay cleaning apparatus 48 includes a shallow trough 52. The trough 52 is partially filled with a clay mixture 50. As illustrated in FIG. 14, when a cat crosses the apparatus 48, the cat's paws 51 sink into the clay and the clay 50 is forced under the cat's nails 54, thereby absorbing dirt or foreign matter.

FIG. 17 illustrates a grooming brush 500 according to the present invention. As shown in FIG. 17, each of the bristles 502 of the grooming brush is formed as a flexible tube which communicates with a container 504. The container is connected to a blower via tube 506. A powder 508 which may be a medicinal powder or a grooming powder is placed in the container. When the blower is turned on, air flows over the powder in the container, picks up a portion of the powder 508 and delivers the powder through the hollow bristles onto the cat's hair.

While two types of grooming brushes have been described above, it should be understood that a conventional grooming brush may also be used.

Figure 34:
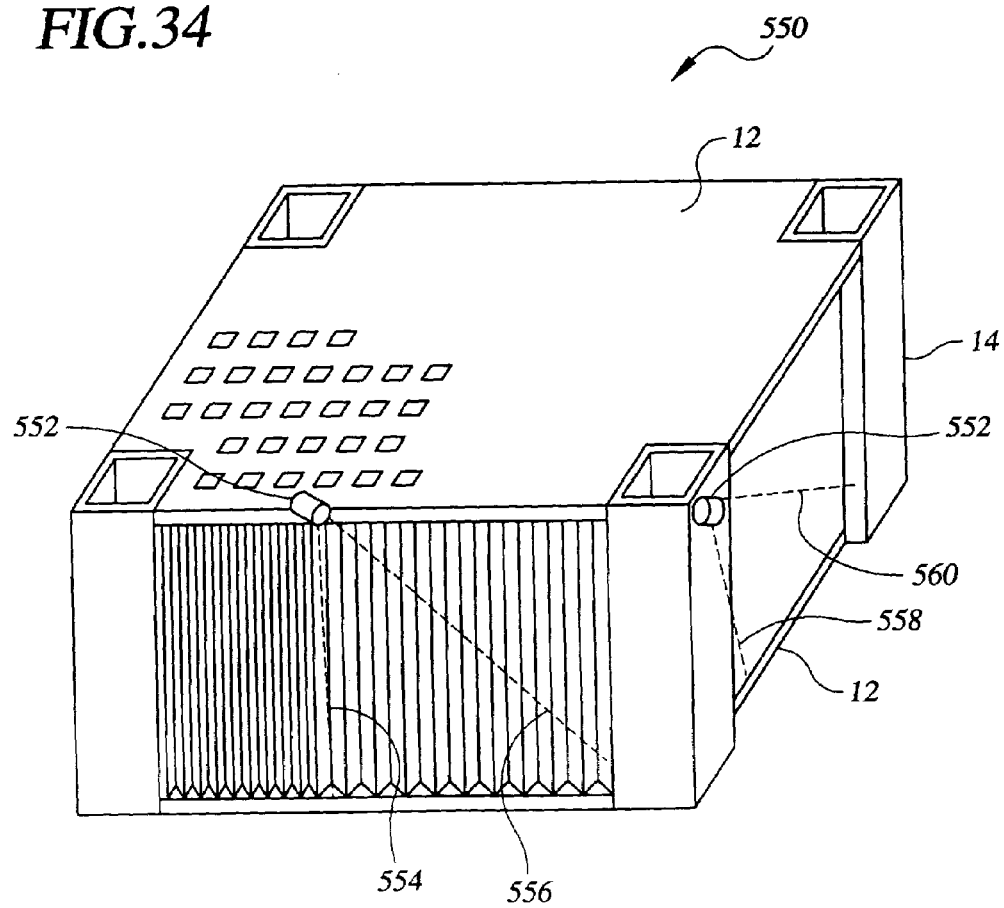
FIG. 34 is an overall perspective view of an alternative embodiment of the invention which incorporates sonic training devices.
Figure 35:
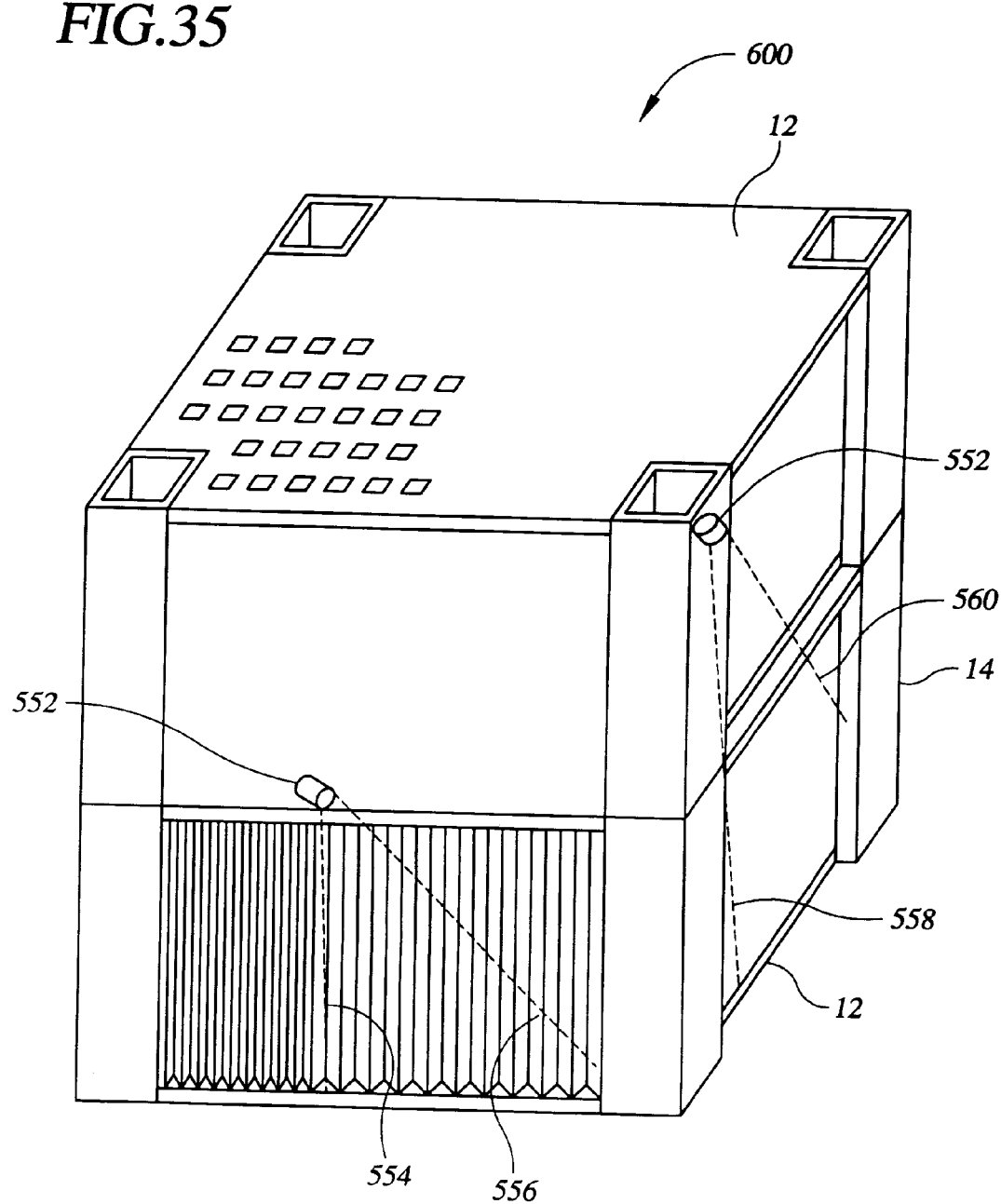
FIG. 35 is an overall perspective view of an alternate embodiment of the invention which has two levels and incorporates sonic training devices.

FIGS. 34 and 35 show alternative embodiments 550, 600 of the invention which incorporate sonic training devices 552. The sonic training devices use heat or motion detection to detect the presence of a cat in the area between the broken lines 554, 556 and 558, 560 which forms a forbidden area. If a cat enters the forbidden area, the sonic training devices 552 emit a high pitched sound which repels the cat.

The sonic training devices 552 enable the owner to train the cat to avoid the forbidden area and enables the owner over time to open the curtain incrementally and remove the mesh screen 24, thereby providing full visual access to the cat while the cat is in the apparatus 550, 600 according to the invention.

Figure 18:
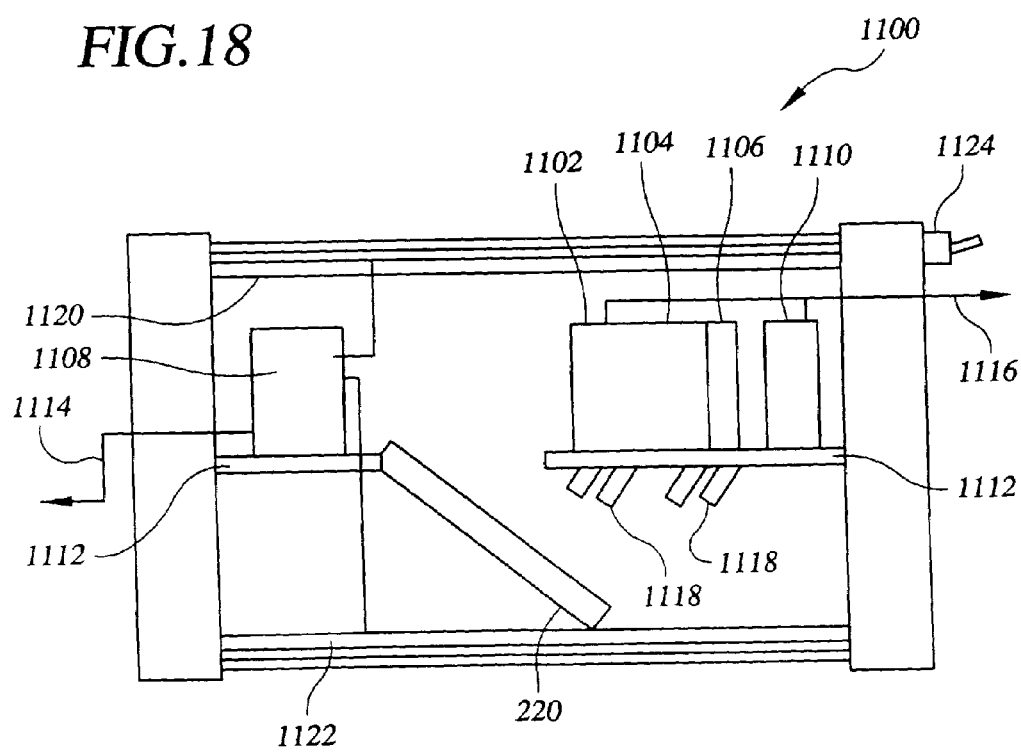
FIG. 18 is a cross-sectional view similar to FIG. 3 showing an alternative embodiment of the invention.

FIG. 18 shows an alternative embodiment of the invention 1100 which includes an air delivery system 1102 which includes combination air conditioning and blower unit 1104, a humidifier unit 1106, a static charge generator 1108, and an ionizer unit 1110, all mounted on a shelf 1112 in the apparatus 1100.

The units 1104, 1106, 1108, 1110 of the air delivery system 1102 are each connected to an external source of electrical power via lines 1114, 1116. The units of the air delivery system 1102 may be controlled by an externally mounted switch 1124 or they may be controlled by an array of sensors as will be presently described.

The air delivery system 1102 provides conditioned air at temperatures up to 80° F. to 90° F. and 30% RH to 40% RH. This temperature range has been found to be beneficial for the grooming process. The vaporizer unit 1110 can be used to create a mist of liquid shampoo which is fed to the brushes via the tubes 1118.

FIG. 18 also shows a pair of spaced apart conductive plates 1120, 1122 mounted in the apparatus 1110. The conductive plates 1120, 1122 receive a static charge from the static charge generator 1108. The charged conductive plates 1120, 1122 serve to attract dust, debris, dander, loose hair from an animal as the animal passes between the charged plates 1120, 1122.

A key feature of the invention is a direct result of the adjustability of the various elements of the apparatus according to the invention. The various apertures formed by the brushes are adjustable so that an animal can be trained by first presenting a relatively large non-threatening aperture which the animal passes through many times each day on its way to and from the food source. As the animal becomes accustomed to this aperture and the grooming action of the brushes, the aperture can be made progressively smaller to increase the grooming action.

The maze feature which has been previously described is also adjustable since the barbs can fit any of the holes in the grid plate. This enables an owner to start with a non-threatening, relatively open maze with relatively widely spaced walls and then progressively decrease the spacing between the walls as the animal becomes trained and also to reconfigure the apparatus from the two maze configuration to a one maze configuration by removing appropriate walls.

The present invention utilizes food alone or food and water as attractive objects to attract the animal into the apparatus. The apparatus may also include a litter station which is spaced away from the feeding unit. The user of food and water ensures that the apparatus will be visited numerous times each day and thereby will receive effective grooming. The combination of food, water, and litterbox in the apparatus further ensures that the animal will continue to visit the apparatus frequently.

As indicated above, as the animal becomes accustomed and trained to use the apparatus, the various elements, such as the solid plastic panels and the mesh screens, can eventually be removed. At some point in the training, the sonic device alone can be used to direct the animal to the proper areas in the apparatus support frame with the exception that the brushes 702, 704 are mounted horizontally. The first and second brush support frames in combination facilitate adjustment of the opening formed by the combination of the brushes 680, 682, 702, 704.

The elastic support strip 686 facilitates the use of a relatively stiff bristle 684 on the brush 682 while enabling the brush 682 to conform to the animal's body and to effectively perform the grooming action without causing extreme discomfort.

Figure 39:
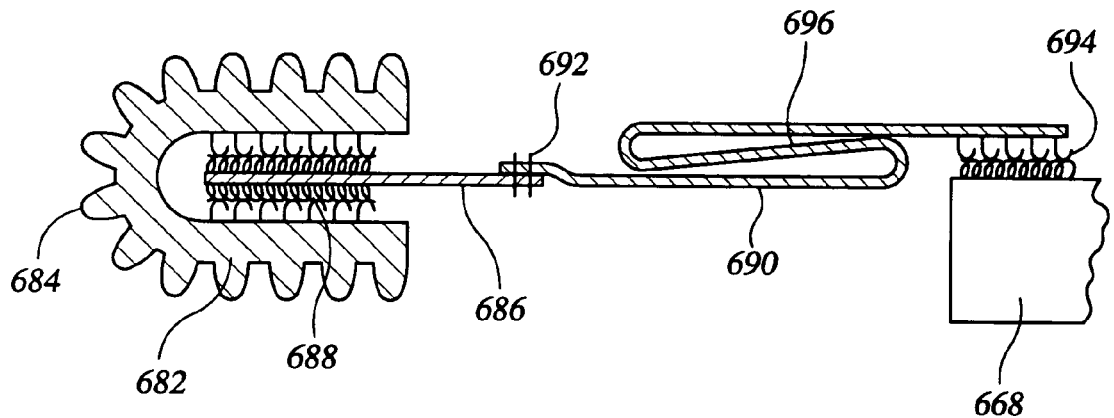
FIG. 39 is a cross-sectional view taken along the line 39—39 of FIG. 38.

The mounting of the brushes 682 on elastic supports 686 as shown in FIG. 39 provides the following benefits. Effective grooming requires a relatively stiff bristle in order to dislodge dirt particles, and comb the hair. However, the use of a relatively stiff bristle creates an unwanted degree of discomfort. The present invention provides the benefits of a stiff bristle without the unwanted discomfort.

Figure 36:
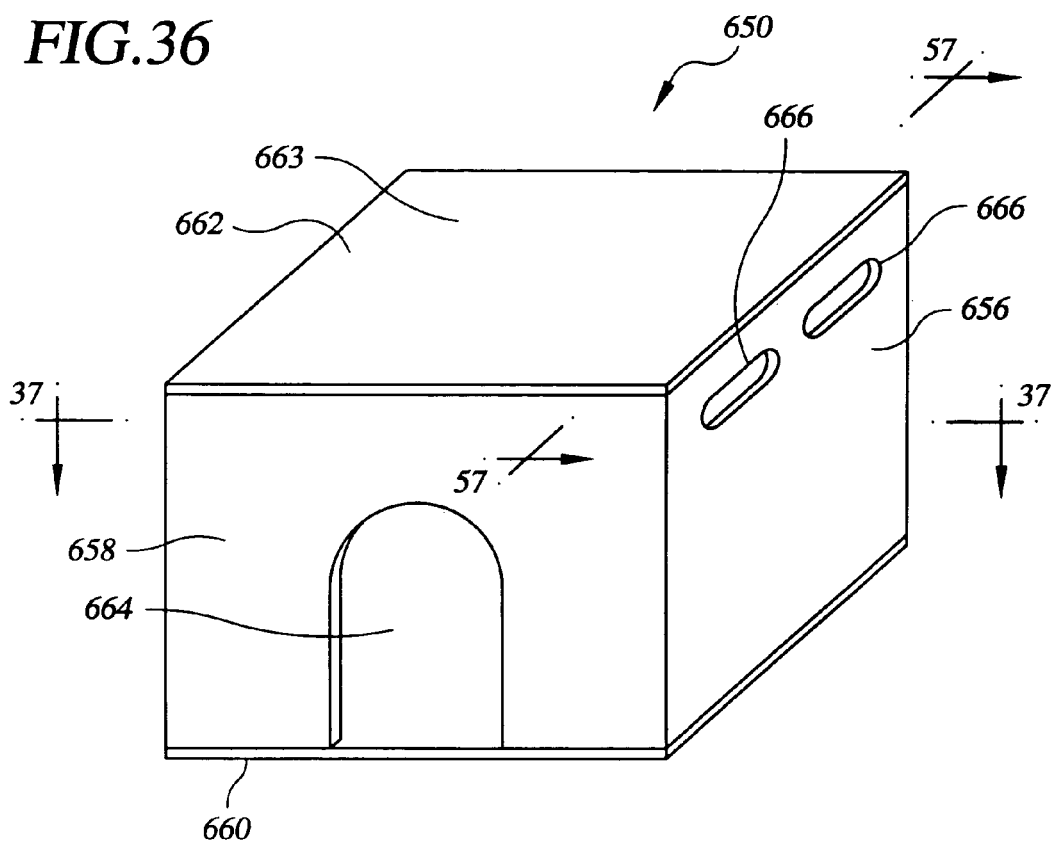
FIG. 36 is an overall perspective of an alternate embodiment of the invention.

FIGS. 36–41 show another alternative embodiment 650 of the invention which incorporates four transparent solid plastic wall panels 652, 654, 656, 658, a bottom panel 660, and a removable top panel 662 forming an enclosure 663. The front panel 652 incorporates a portal 664. The side panels 652, 656 incorporate vent apertures 666 which are best shown in FIG. 36. A food Supply is Shown schematically as circle 667.

Figure 37:
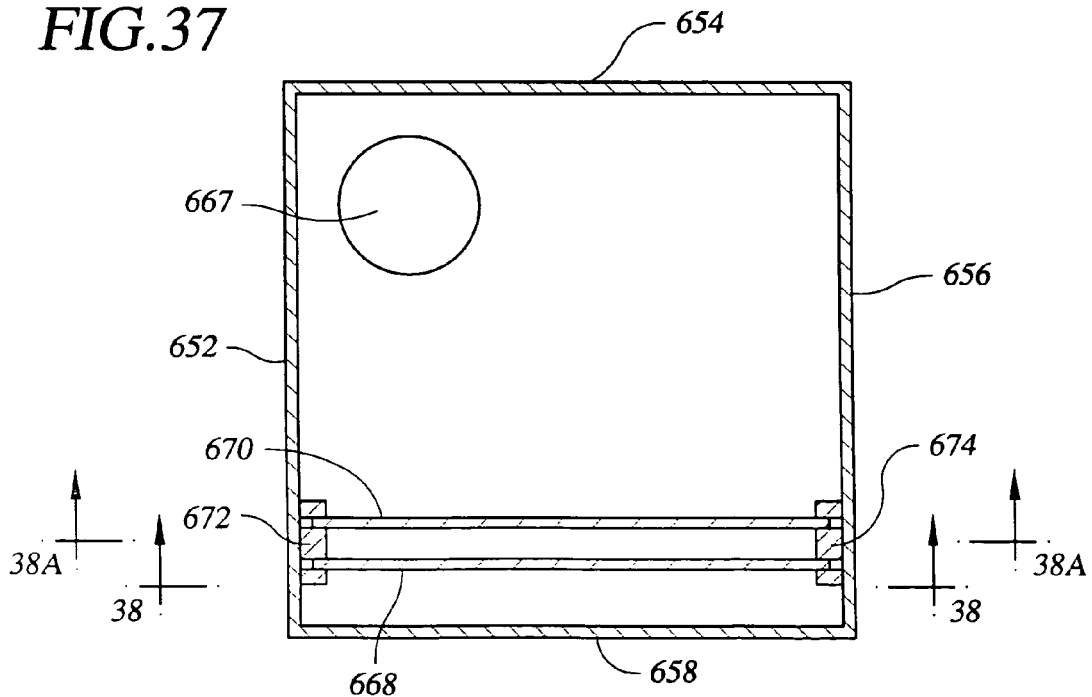
FIG. 37 is a cross-sectional view taken along the line 37—37 of FIG. 36.
Figure 38:
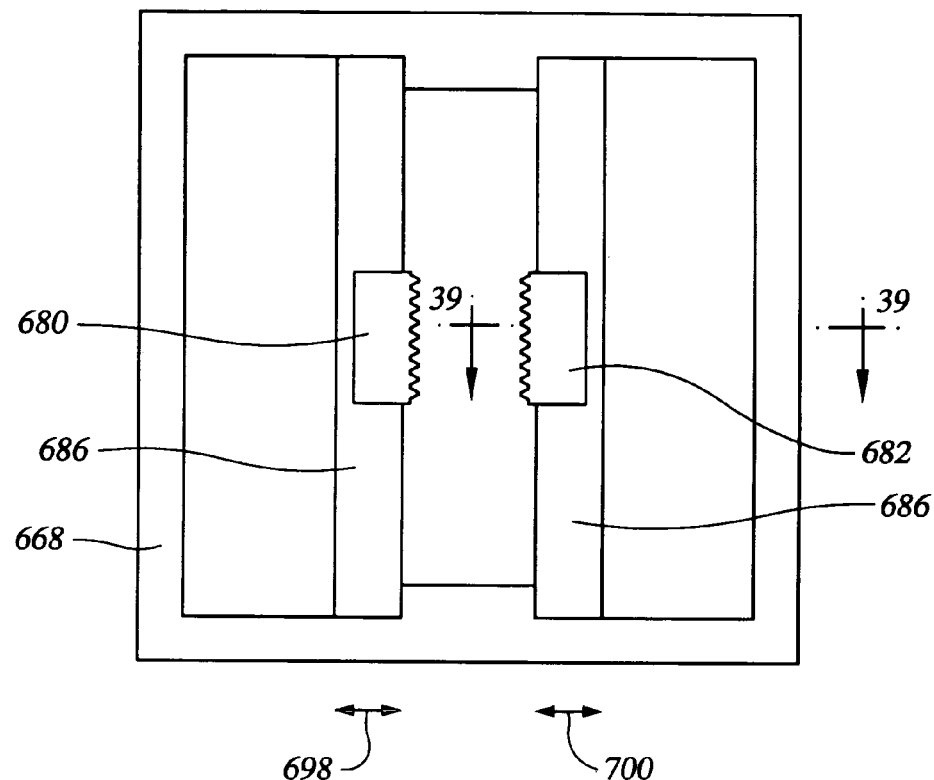
FIG. 38 is a view of the grooming brushes taken along the line 38—38 of FIG. 37.

As shown in FIG. 37, a pair of brush support frames 668 are slideably mounted in slide brackets-672, 674 on the side panels 652, 656. As shown ill FIG. 40, each of the brush support frames 670 includes a plurality of hook and loop fastener strips 676, 678. FIG. 38 shows a pair of vertical brushes 680, 682, which are mounted on the first brush support frame 668. As shown in FIG. 39, the brush 682 is in the nature of a sheet of rubber which includes a plurality of projections 684. The brush 682 is mounted on an elastic support strip 686 by a hook and loop fastener 688. The elastic support strip is connected to a fabric sheet 690 by stitching 692. The fabric sheet 690 is folded as is shown in FIG. 39 and is connected to the brush support frame 668 by the hook and loop fasteners 694. The fold 696 in the fabric sheet 690 facilitates adjustment of the position of the brush in the directions shown by the arrows 698, 700 in FIG. 38.

Figure 40:
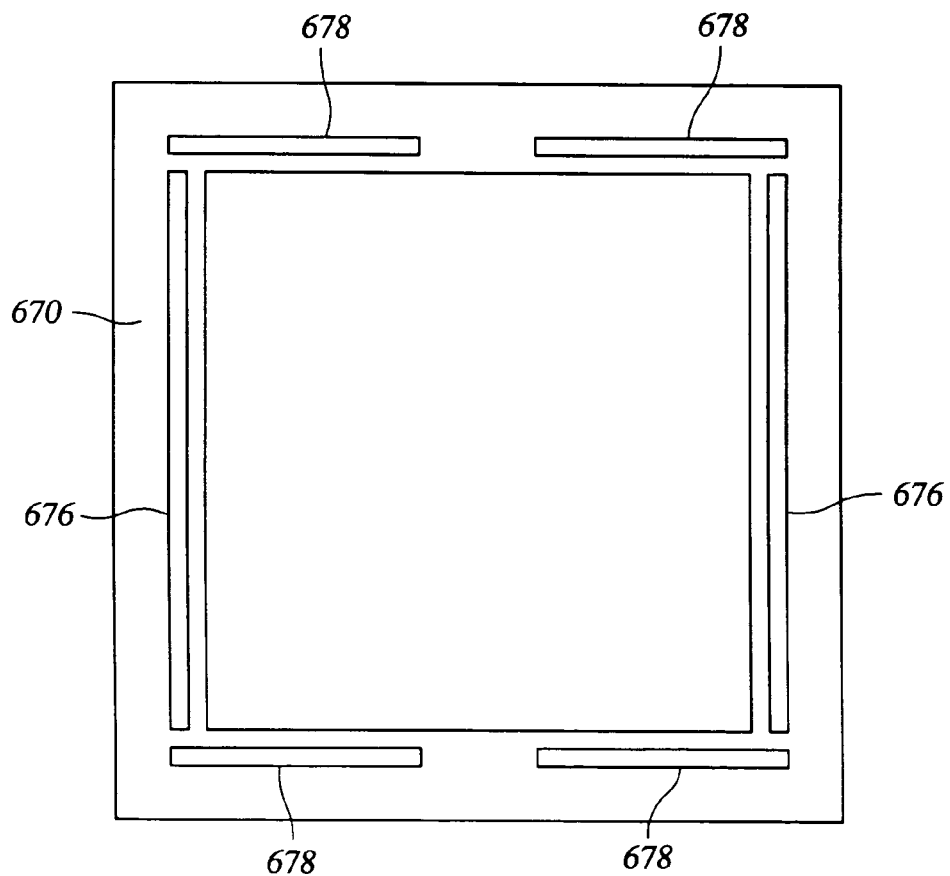
FIG. 40 is a front view of the brush support frame of FIG. 38.
Figure 41:
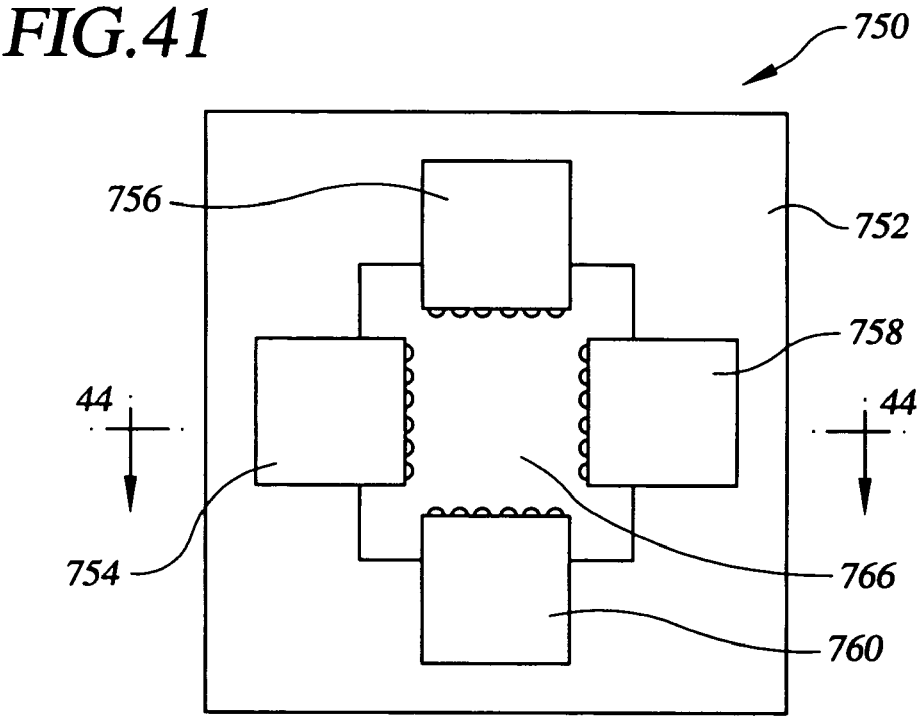
FIG. 41 is a front view of the brush support frame of another embodiment of the invention.
Figure 42:
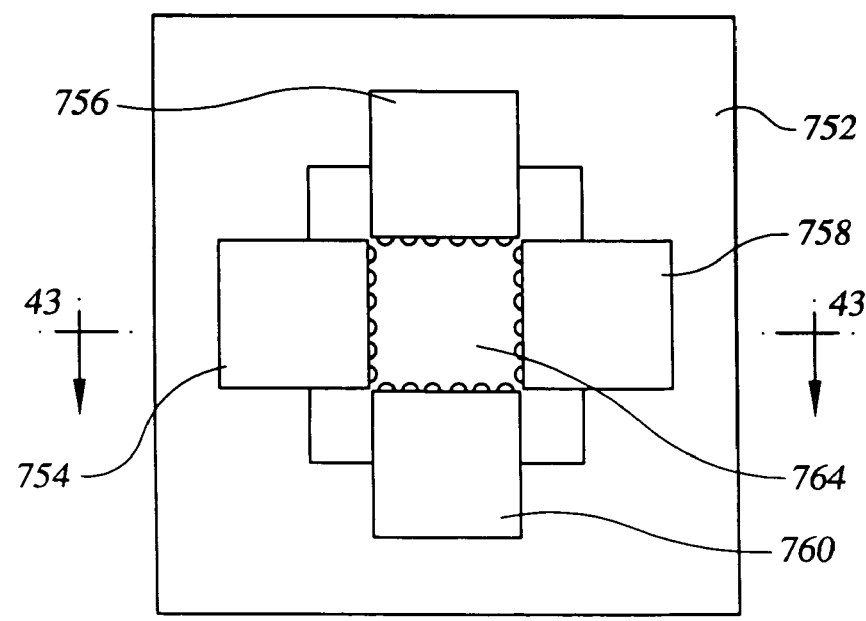
FIG. 42 is a front view of a support frame similar to FIG. 41 showing a smaller opening.

As shown in FIG. 40, each of the brush support frames 670 includes a plurality of hook and loop fastener strips 676, 678. FIG. 38 shows a pair of vertical brushes 680, 682 which are mounted on the first brush support frame 668. As shown in FIG. 39, the brush 682 is in the nature of a sheet of rubber which includes a plurality of projections 684 which function as stiff bristles. The brush 682 is mounted on an elastic support strip 686 by a hook and loop fastener 688. The maze panels, motion sensors, and clay carpet paw cleaning areas. The structure also includes a feeding station, a litterbox and optionally, a ramp leading to a second level which have been described in connection with FIGS. 1 and 2.

Figure 38A:
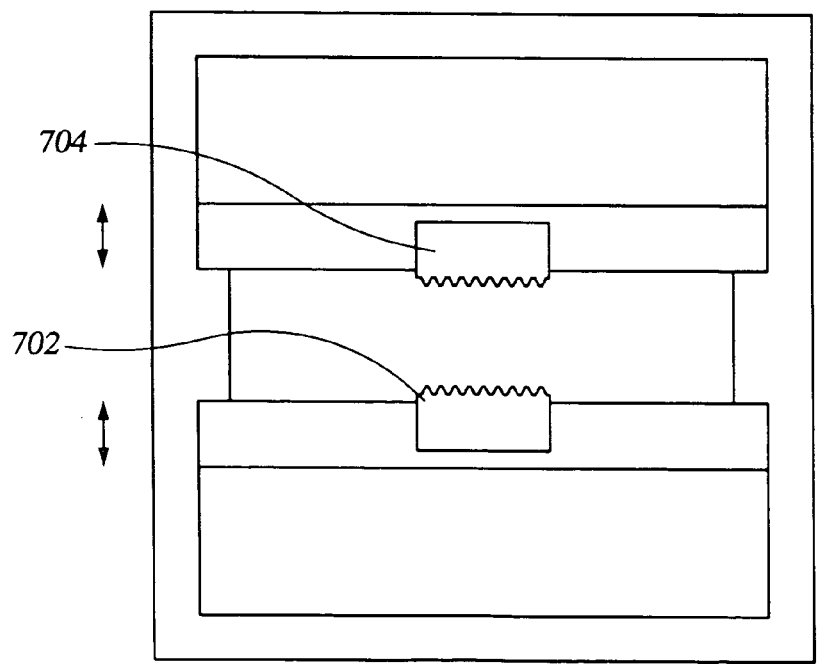
FIG. 38A is a view of the grooming brushes taken along the line 38A—38A of FIG. 37.

FIG. 38A is a front view of the second brush support frame 670. The second brush support frame 670 is identical to the first brush 668 support frame with the exception that the brushes 702, 704 are mounted horizontally. The first and second brush support frames in combination facilitate adjustment of the opening formed by the combination of the brushes 680, 682, 702, 704.

FIGS. 41–45 show another embodiment of the invention 750 which utilizes a single brush support frame 752 in the enclosure shown in FIG. 36. As shown in FIGS. 41–45, the brushes 754, 756, 758, 760 are formed as rubber sheets each with a plurality of protrusions 762 as previously described. The brushes 754, 756, 758, 760 are mounted on the brush support frame 752 by look and loop fasteners 762 and can be adjusted as shown in FIGS. 41–44 to form a smaller 764 or a larger 766 aperture.

Figure 46:
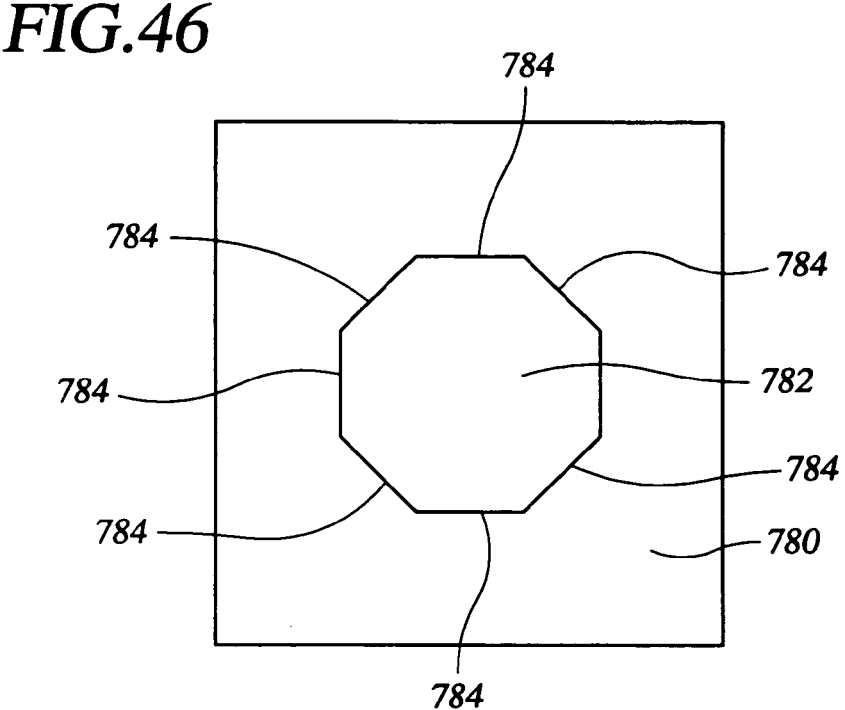
FIG. 46 is a front view of an alternative brush support frame.
Figure 47:
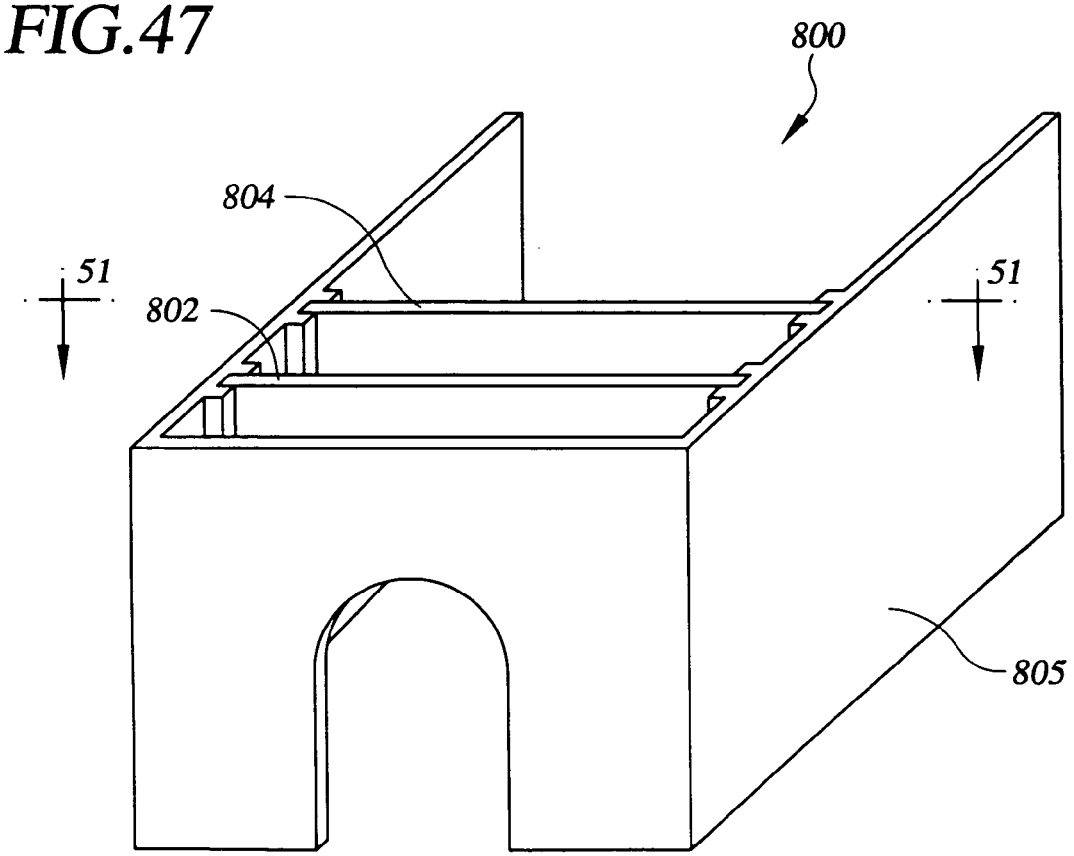
FIG. 47 is a perspective view another embodiment of the invention.

FIG. 46 shows an alternative brush support frame 780 which features an octagonal opening 782. Eight brushes each identical to the brushes 754, 756, 758, 760 are mounted on the edges 784 of the aperture 782 in the manner previously described.

Figure 48:
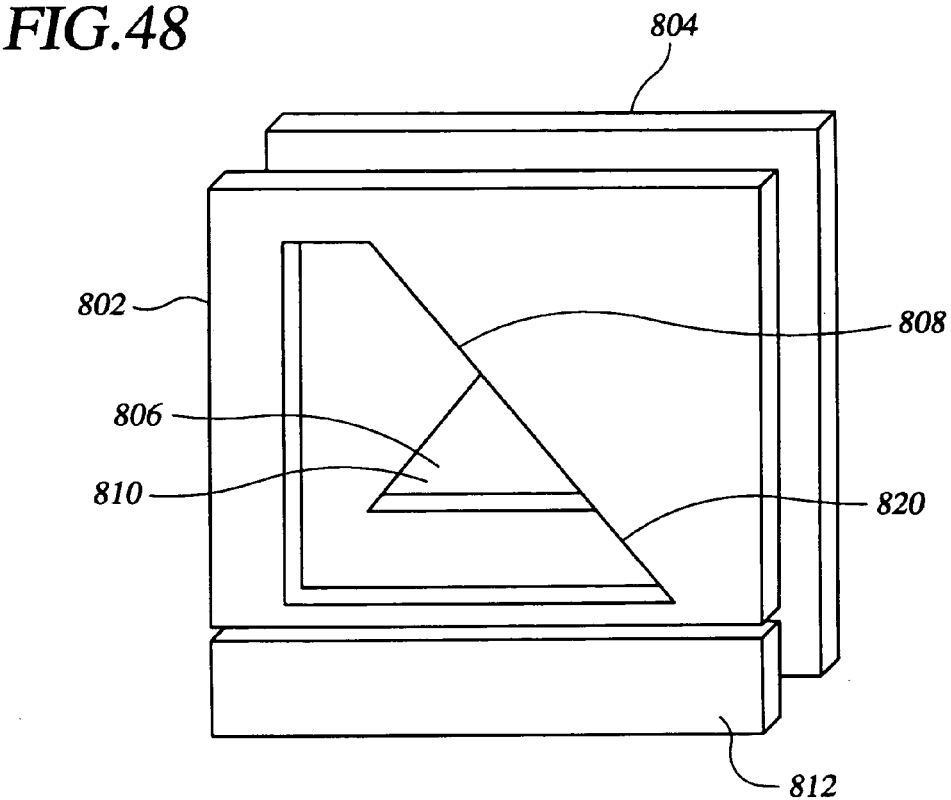
FIG. 48 is an exploded perspective view of the brush mounting plate assembly of the embodiment of FIG. 47.
Figure 49:
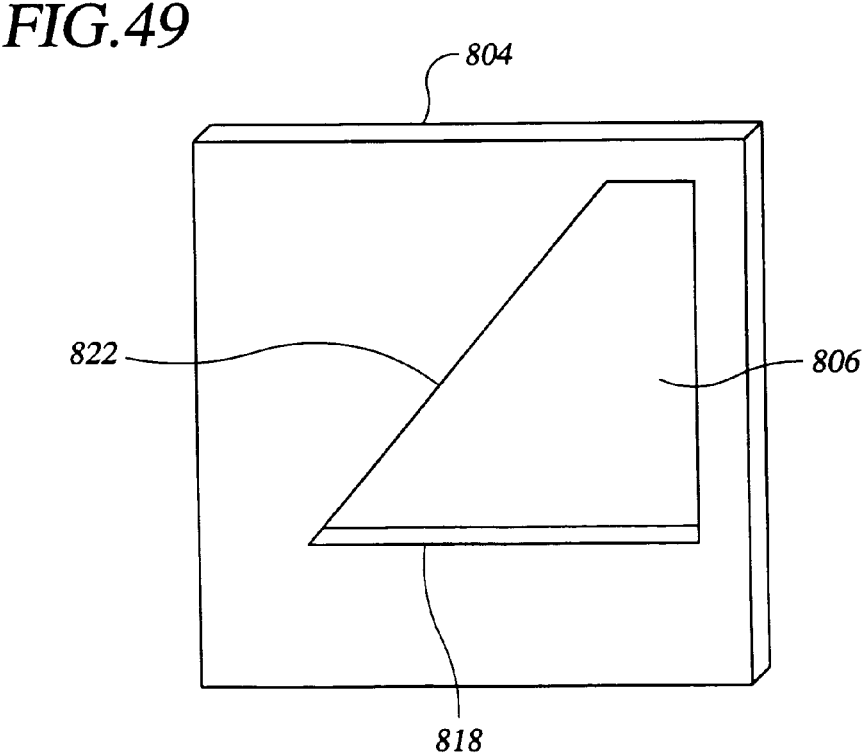
FIG. 49 is a perspective view of a first brush mounting plate shown removed from the embodiment of FIG. 47.

FIGS. 47–51 show another alternative embodiment of the invention 800 which utilizes a pair of brush support frames 802, 804, which are slideably mounted in an enclosure 805. Each of the brush support frames 802, 804 feature a triangular opening 806, 808. The effective aperture 810 is formed by the combination of the first brush support frame 802 and the second brush support frame 804 as is shown in FIG. 48. The size of the effective aperture 810 is adjusted by charging the height of the spacer 812 which supports the first brush support frame 802.

Figure 43:
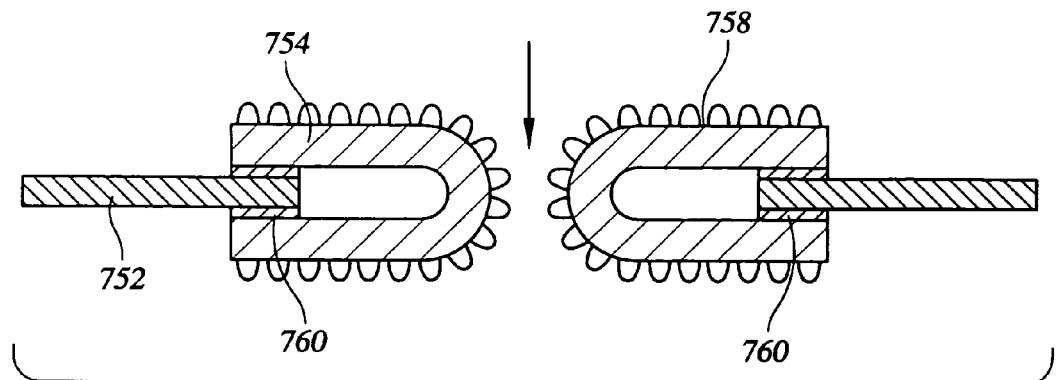
FIG. 43 is a cross-sectional view taken along the line 43—43 of FIG. 41.
Figure 44:
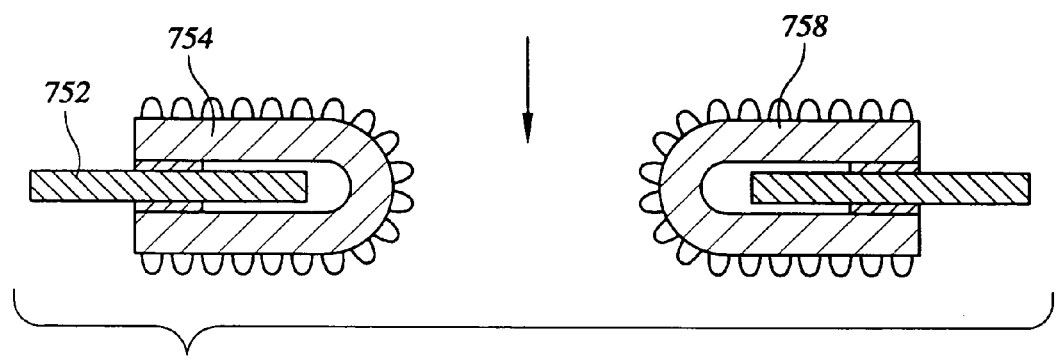
FIG. 44 is a cross-sectional view taken along the line 44—44 of FIG. 42.
Figure 45:
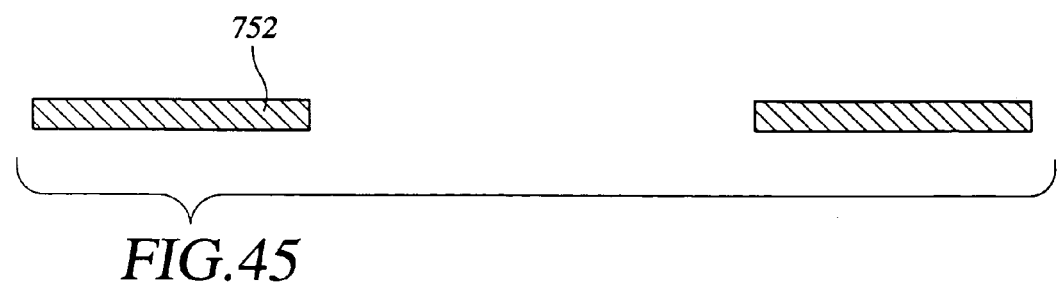
FIG. 45 is a cross-sectional view similar to FIGS. 43 and 44 with the brushes removed.
Figure 50:
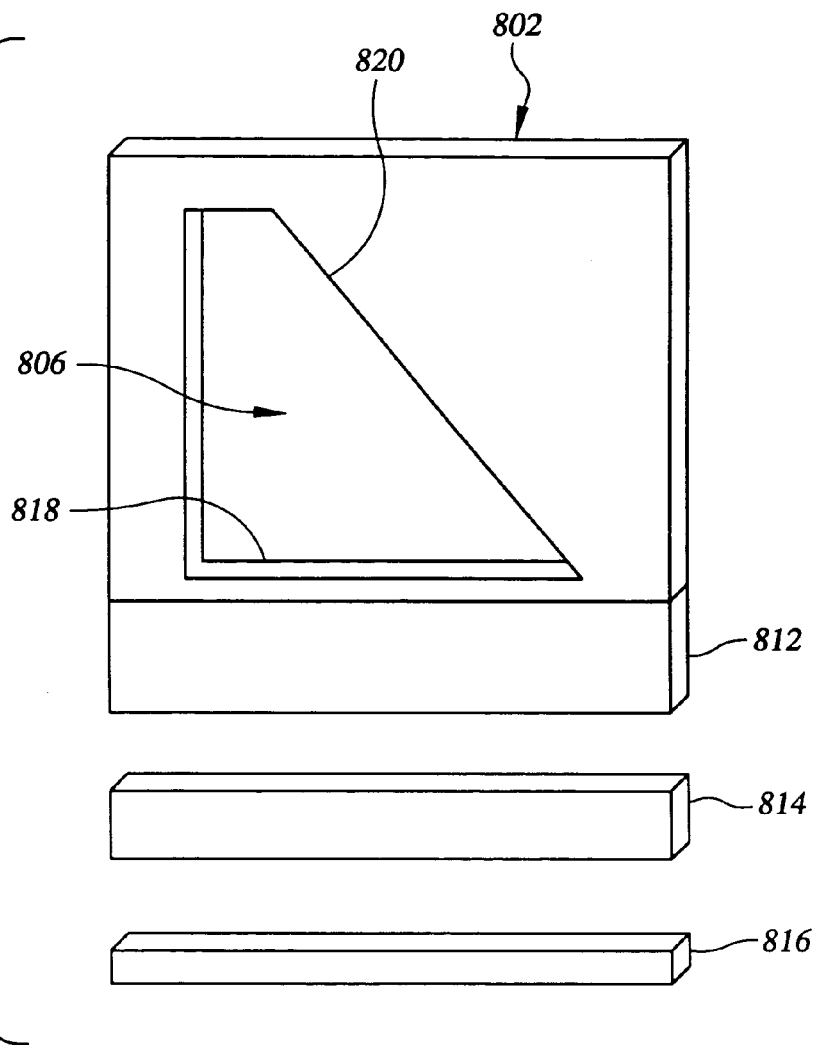
FIG. 50 is a perspective view of a second brush mounting plate and associated spacer plates.
Figure 51:
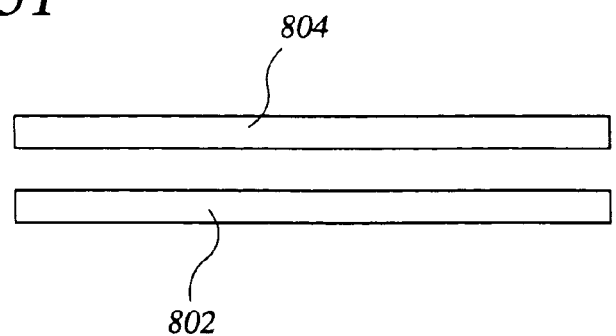
FIG. 51 is a fragmentary top view of the brush mounting plate taken along the line 51—51 of FIG. 47.
Figure 52:
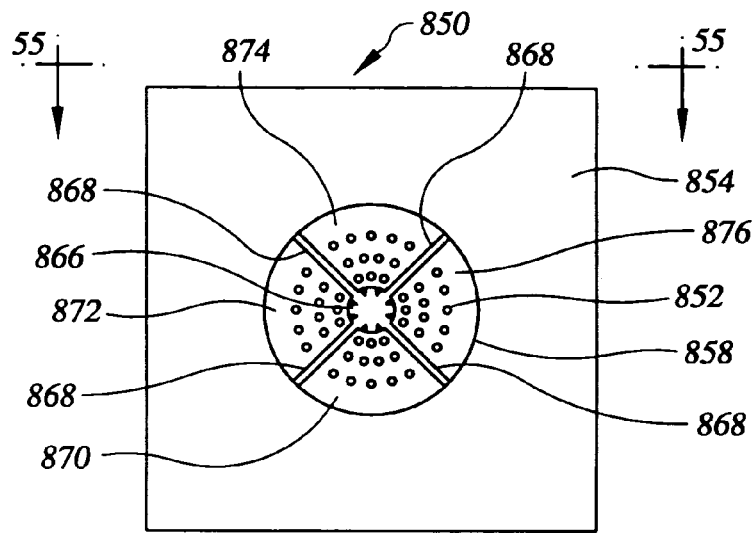
FIGS. 52–55 show another embodiment of the present invention.

As shown in FIG. 50 by way of example, three spacers 812, 814, 816 of different heights are provided to adjust the vertical position of the first support frame 802. Brushes which are identical to the brush 754, previously described in connection with FIG. 43, are mounted on hook and loop fasteners are disposed on edges 818, 820, 822.

Figure 53:
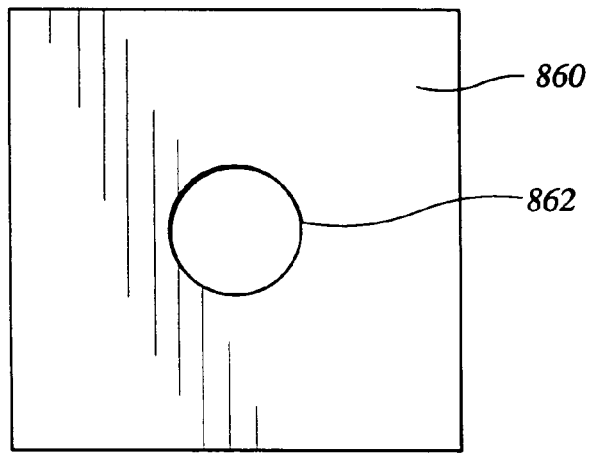
Figure 54:
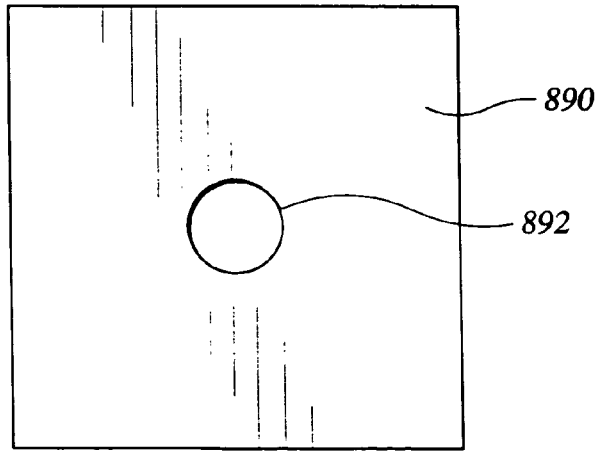
Figure 55:
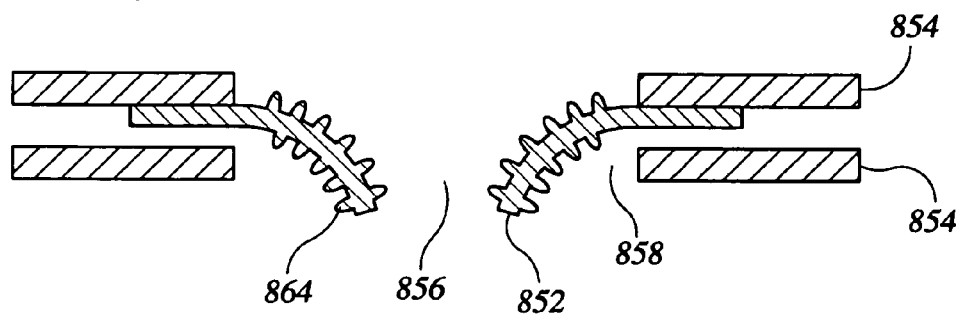

FIGS. 52–55 show another alternative embodiment 850 of the invention in which a brush member 852 mounted between a pair of brush plates 854. As is shown in FIG. 55, the effective size of the aperture 856 is controlled by the holes 858 in the brush plates 854.

As shown in FIGS. 53, 54, brush plates 860, 890 with different size apertures 862, 892 are provided. The brush member 852 is formed as a rubber sheet with a plurality of protrusions 864. The brush member 852 includes a small central aperture 866 and four radial slits 868 which allow the brush member 852 to flex forming four flap-like portions 870, 872, 874 and 876.

Figure 56:
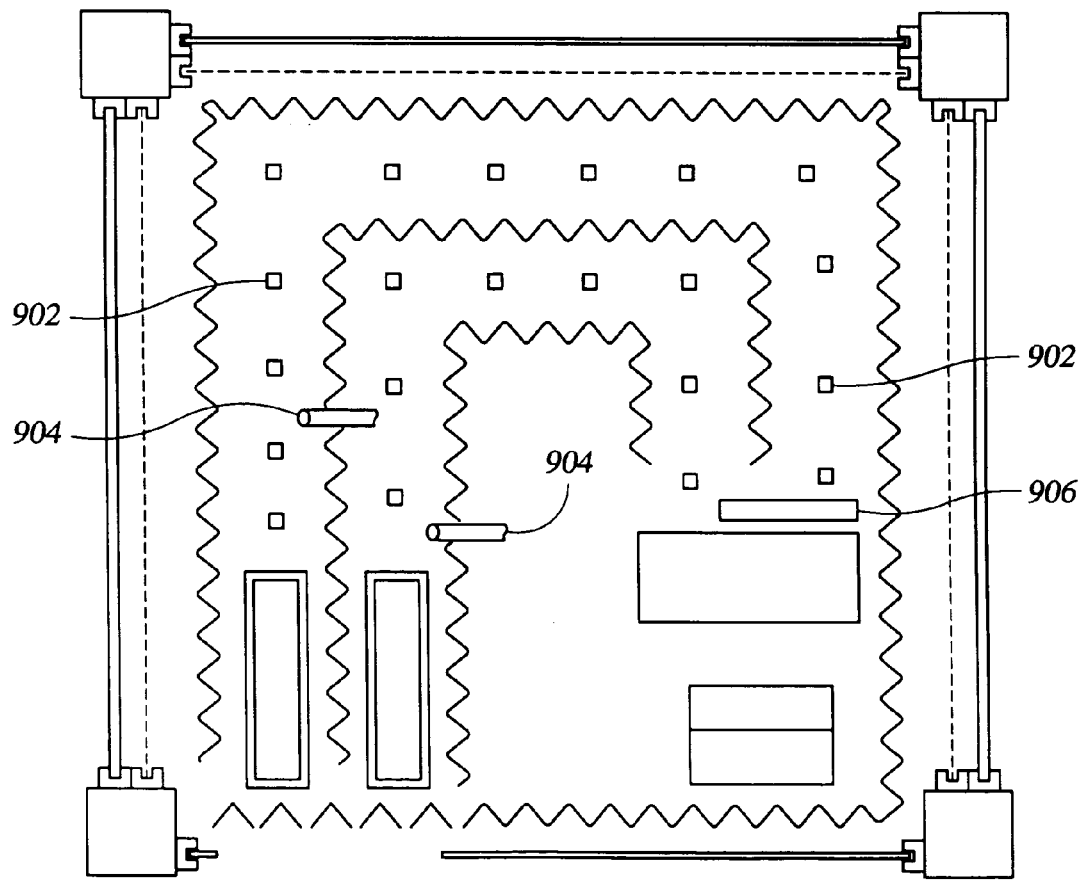
FIG. 56 shows yet another embodiment of the present invention.

FIG. 56 shows another embodiment of the invention 900 which incorporates a plurality of electrical outlets 902 on the floor panel. The electrical outlets 902 facilitate the operation of a plurality of motion sensors 904 and a plurality of dispensers for dispensing mist, spray or various medicinal or cosmetic substances as the animal passes through the maze. One such dispenser is shown schematically as the rectangle 906 by way of example in FIG. 56. The structure of FIG. 56 includes the solid plastic wall panel, a mesh wall panel, accordion elastic sheet maze panels, motion sensors and clay carpet paw cleaning areas. The structure also includes a feeding station, a litterbox and optionally, a ramp leading to second level which has been described in connection with FIGS. 1 and 2.

Figure 57:
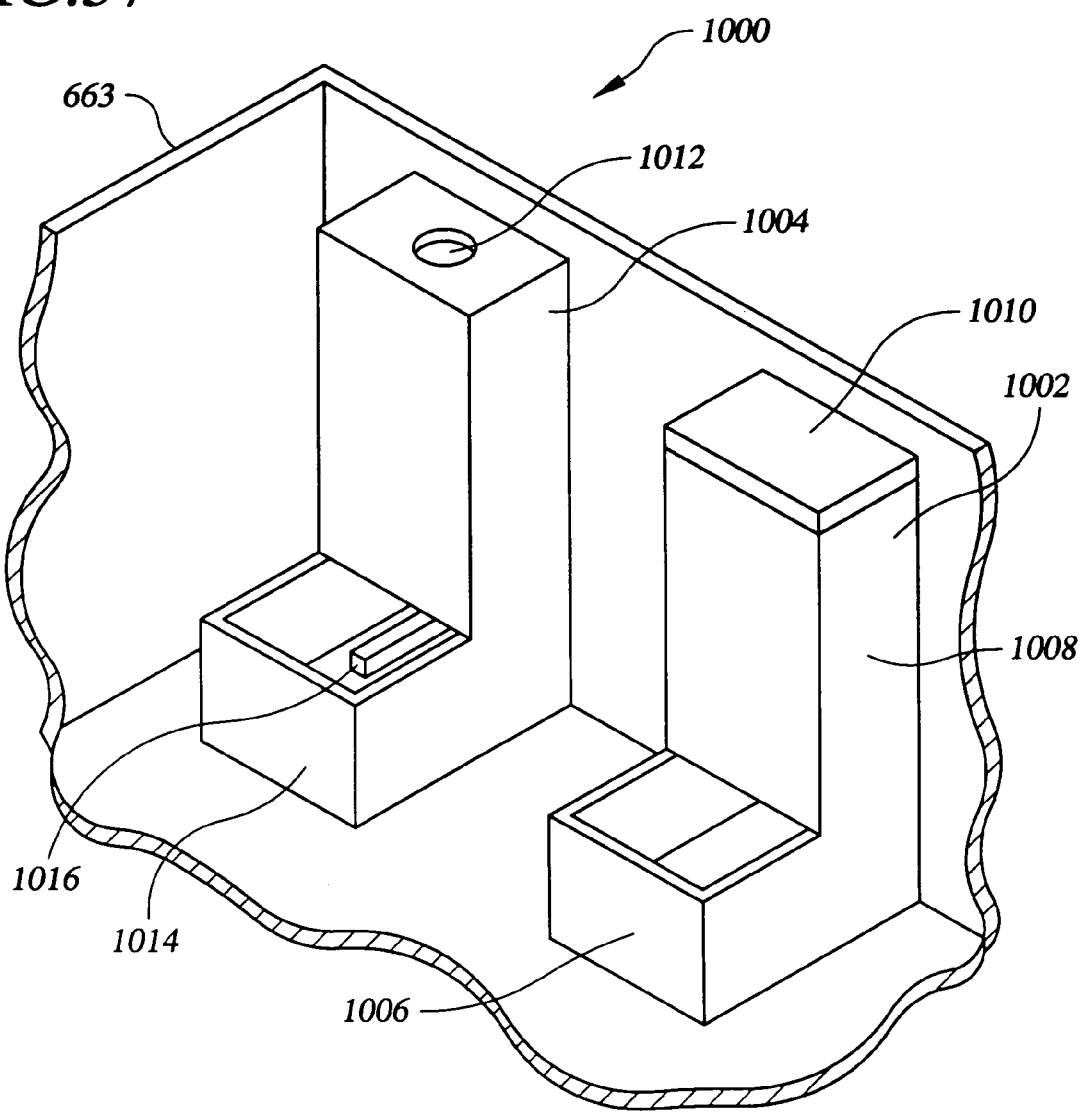
FIG. 57 is a fragmentary perspective view taken along the line 52—52 of FIG. 36 which shows still another alternative embodiment of the invention which incorporates a feeding station and a water dispenser.

FIG. 57 shows another embodiment of the invention 1020 in which the enclosure 663 includes a feeding station 1002 and a water dispensing station 1004. The feeding station 1002 comprises an integral food tray 1006 and food container 1008 which can be filled by opening the lid 1010. The water dispensing station 1004 is filled through the aperture 1012 and the water fills the trough 1014. The flow of water is controlled by a lever operated valve 1016 which is operated by the animal to discharge water into the trough 1014.

What is claimed is:

1. An automatic animal grooming, feeding and litterbox apparatus comprising:
   an enclosure;
   a source of food disposed in said enclosure;
   a portal formed in said enclosure, the portal being an aperture defined by a plurality of frames inwardly adjustable toward one another to thereby narrow the aperture; and
   a grooming brush means disposed on at least two of the frames, wherein the brush means comprise brushes mounted on a flexible support means to substantially engage an animals body.

2. The apparatus of claim 1 further comprising:
   a first level in said enclosure;
   a second level in said enclosure;
   ramp means disposed leading from said first level to said second level.

3. The apparatus of claim 1 in which said enclosure comprises:
   a solid wall panel;
   a mesh wall panel; and
   an accordion wall panel erected within the enclosure.

4. The apparatus of claim 3 in which said solid wall panel, said mesh wall panel, and said accordion wall panel are each removable from said enclosure.

5. The apparatus of claim 1 further comprising a maze disposed between said portal and said food source with a further grooming brush means disposed in said maze.

6. The apparatus of claim 5 in which said maze is adjustable.

7. The apparatus of claim 2 in which said ramp means further comprises nail grooming means.

8. The apparatus of claim 7 in which said nail grooming means comprises:
   an abrasive layer; and
   a flexible mesh layer disposed spaced away from said abrasive layer.

9. The apparatus of claim 1 in which said grooming brush means further comprises:
   a grooming brush and an elastic support supporting said grooming brush.

10. The apparatus of claim 1 in which said grooming brush means comprises:
    a grooming brush comprising a plurality of hollow bristles.

11. The apparatus of claim 10 in which said hollow bristles further comprise a plurality of barbs on the hollow bristles.

12. The apparatus of claim 10 further comprising:
    a powder storage means;
    air delivery means communicating with said powder storage means and said plurality of hollow bristles for delivery of powder from said powder storage means through said hollow bristles.

13. The apparatus of claim 1 in which said grooming brush means comprises a plurality of curved bristles.

14. The apparatus of claim 1 further comprising litterbox means mounted in said enclosure.

15. The apparatus of claim 1 further comprising air conditioning means mounted in said enclosure.

16. The apparatus of claim 15 in which said air conditioning means comprises humidifier and temperature control means.

17. The apparatus of claim 15 in which said conditioning means comprises vaporizer means.

18. The apparatus of claim 15 in which said air conditioning means comprises a pair of spaced apart conductive plates and electrostatic generator means connected to said conductive plates.

19. The apparatus of claim 15 further comprising:
   sensor means; and
   control means disposed in said enclosure for sensing the position of an animal in said enclosure and operating said air conditioning means.

20. The apparatus of claim 3 comprising:
   a second enclosure; and
   connector means for connecting said enclosure to said second enclosure to form a combined enclosure.

21. The apparatus of claim 1 in which said enclosure comprises an upper grid plate and a lower grid plate.

22. The apparatus of claim 1 further comprising:
   open container means mounted in said enclosure; and
   clay material disposed in said open container means.

23. The apparatus of claim 1 further comprising:
   a portal closure with said portal closure comprising a pair of flexible panels; and
   a magnetic closure removably connecting said flexible panels.

24. The apparatus of claim 1 in which said grooming brush means further comprises shedder means mounted in said grooming brush means.

25. The apparatus of claim 1 further comprising:
   sonic generator means for generating sonic energy with said sonic generator means mounted on said enclosure for dissuading an animal from entering selected areas of said enclosure.

26. The apparatus of claim 1 further comprising
   a pair of solid plates each having an aperture with said solid plates mounted one in front and one in the rear of the portal aperture formed with the plurality of frames and rooming brush means.

27. The apparatus of claim 1 further comprising an accordion wall panel within the said enclosure.

28. The apparatus of claim 1 further comprising an accordion panel forming an outer wall of the enclosure and having a plurality of slits enabling a cat to enter the apparatus.

* * * * *